(12) United States Patent
Liang et al.

(10) Patent No.: US 11,960,879 B2
(45) Date of Patent: Apr. 16, 2024

(54) CODE CONFLICT RESOLUTION SYSTEM AND METHOD, APPARATUS, DEVICE, AND MEDIUM

(71) Applicant: Huawei Cloud Computing Technologies Co., Ltd., Guizhou (CN)

(72) Inventors: Guangtai Liang, Beijing (CN); Zhao Wei, Gui'an (CN); Lin Li, Beijing (CN); Anqi Yu, Hangzhou (CN); Shanbin Cheng, Beijing (CN); Qianxiang Wang, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 81 days.

(21) Appl. No.: 17/722,897

(22) Filed: Apr. 18, 2022

(65) Prior Publication Data

US 2022/0236981 A1    Jul. 28, 2022

Related U.S. Application Data

(63) Continuation of application No. PCT/CN2020/121872, filed on Oct. 19, 2020.

(30) Foreign Application Priority Data

Oct. 18, 2019  (CN) .......................... 201910996009.5
Dec. 12, 2019  (CN) .......................... 201911274195.8

(51) Int. Cl.
  *G06F 9/44*  (2018.01)
  *G06F 8/71*  (2018.01)
  *G06F 8/73*  (2018.01)

(52) U.S. Cl.
  CPC . *G06F 8/71* (2013.01); *G06F 8/73* (2013.01)

(58) Field of Classification Search
  None
  See application file for complete search history.

(56) References Cited

U.S. PATENT DOCUMENTS 9,430,229 B1    8/2016   Van Zijst et al.
9,483,259 B1   11/2016   Lee et al.
(Continued)

FOREIGN PATENT DOCUMENTS

CN    101558377 A    10/2009
CN    102541941 A     7/2012
(Continued)

OTHER PUBLICATIONS

"Apache Subversion, Enterprise-class centralized version control for the masses," printed from the website by Nov. 22, 2022, 3 pages.
(Continued)

*Primary Examiner* — Qamrun Nahar
(74) *Attorney, Agent, or Firm* — Conley Rose, P.C.

(57) ABSTRACT

A local apparatus is configured to perform resolution on a conflict field generated by code files of a plurality of versions, and send a conflict resolution result to the service apparatus. The conflict field includes at least one conflict block, and the conflict resolution result includes at least one of a resolution result of a local resolvable conflict block and an identifier of a local irresolvable conflict block. The remote apparatus is configured to obtain the conflict resolution result from the service apparatus, generate a collaborative processing window based on the conflict resolution result, and receive a result of processing the conflict resolution result by a remote user based on the collaborative processing window.

20 Claims, 13 Drawing Sheets

(56) References Cited

U.S. PATENT DOCUMENTS

| | | | |
|---|---|---|---|
| 9,906,398 B1 | 2/2018 | Passaglia et al. | |
| 2007/0283321 A1* | 12/2007 | Hegde | G06F 8/71 717/110 |
| 2008/0301486 A1* | 12/2008 | Lee | G06F 8/71 714/E11.023 |
| 2012/0284684 A1* | 11/2012 | Michaely | G06F 8/40 717/103 |
| 2013/0055233 A1 | 2/2013 | Hatton et al. | |
| 2015/0220331 A1* | 8/2015 | Bernstein | G06F 8/71 717/121 |
| 2016/0259631 A1 | 9/2016 | Jing et al. | |
| 2020/0264868 A1* | 8/2020 | Thakkar | G06F 8/73 |
| 2022/0236981 A1 | 7/2022 | Liang et al. | |

FOREIGN PATENT DOCUMENTS

| | | |
|---|---|---|
| CN | 103425630 A | 12/2013 |
| CN | 104407901 A | 3/2015 |
| CN | 105468650 A | 4/2016 |
| CN | 106126410 A | 11/2016 |
| CN | 108073501 A | 5/2018 |
| CN | 109165169 A | 1/2019 |
| CN | 109343841 A | 2/2019 |
| CN | 110162334 A | 8/2019 |
| CN | 110825427 A | 2/2020 |
| CN | 111176983 A | 5/2020 |

OTHER PUBLICATIONS

"Beyond Compare" printed from the website by Nov. 22, 2022, 5 pages.
"Git" printed from the website by Nov. 22, 2022, 2 pages.
"Kdiff3," Printed from the Website by Nov. 11, 2022, 8 pages.
"Meld, Visual diff and merge tool," printed from the website by Nov. 22, 2022, 2 pages.
"SemanticMerge," printed from the website by Nov. 22, 2022, 2 pages.
"Sublimerge: The professional diff and merge tool for Sublime Text," printed from the vebsite by Nov. 22, 2022, 3 pages.
Yuichi Nishimura, "Supporting Merge Conflict Resolution by Using Fine-Grained Code Change History," IEEE 23rd International Conference on Software Analysis, Evolution, and Reengineering (SANER), 2016, 4 pages.
"TortoiseGit: Windows Shell Interface to Git," printed from the vebsite by Nov. 22, 2022, 2 pages.
Christian Bird, et al., "The Promises and Perils of Mining Git," MSR, May 15, 2009, 10 pages.

\* cited by examiner

| Conflict file view | Project view | Exit | Save | Conflict file | − | 1 | + | Conflict block | − | 1 | + |
|---|---|---|---|---|---|---|---|---|---|---|---|
| Conflict file (0/11) ⌄ | | Ours | | Base | | | | Theirs | | | |
| p2p/wifip2pservice.java ○ | | ⋮ | | ⋮ | | | | ⋮ | | | |
| ⋮ | | | | | | | | | | | |
| p2p/wifipermisions.java ○ | | ☐ To be confirmed | The tool is unlocked automatically, and the codes are from both parties and need to be manually checked (confidence: 89%) ⋮ | | | | | Fall back to a conflict state | | | |
| | | | | | | | | Previous conflict block ⇧ Next conflict block ⇩ | | | |

FIG. 7

| Conflict file view | Project view | Exit | Save | Conflict file | − | 1 | + | Conflict block | − | 2 | + |
|---|---|---|---|---|---|---|---|---|---|---|---|
| Conflict file (0/11) ⌄ | | Ours | | Base | | | | Theirs | | | |
| p2p/wifip2pservice.java ○ | | ⋮ | | ⋮ | | | | ⋮ | | | |
| ⋮ | | | | | | | | | | | |
| p2p/wifipermisions.java ○ | | Ours | Base | Theirs | | | | Ours and Theirs | Theirs and Ours | | |
| | | ⋮ | | | | | | Previous conflict block ⇧ Next conflict block ⇩ | | | |

FIG. 8

CODE CONFLICT RESOLUTION SYSTEM AND METHOD, APPARATUS, DEVICE, AND MEDIUM

CROSS-REFERENCE TO RELATED APPLICATIONS

This is a continuation of International Patent Application No. PCT/CN2020/121872 filed on Oct. 19, 2020, which claims priority to Chinese Patent Application No. 201910996009.5 filed on Oct. 18, 2019 and Chinese Patent Application No. 201911274195.8 filed on Dec. 12, 2019. All of the aforementioned patent applications are hereby incorporated by reference in their entireties.

TECHNICAL FIELD

This disclosure relates to the computer field, and in particular, to a code conflict resolution system and method, a device, and a medium.

BACKGROUND

Currently, many software projects are developed by many people. In a collaboration process, code version management tools such as Git and Subversion (SVN) are often used to perform code version management, to facilitate intra-team code review, problem location, later version maintenance, and the like. In the process of code version management performed based on Git and SVN, to ensure collaboration of team members, project branches generally include a personal development branch, a feature branch, a backbone branch, a commercial branch, and an external open source branch. To implement code merge, feature incorporation, feature migration, defect repair synchronization, and the like, a large amount of code synchronization is needed between these branches, to implement code multiplexing and team collaboration. During branch synchronization, once code changes between two branches conflict, the code version management tool generates a conflict field and prompts a developer to resolve a conflict. Code can be submitted only after the conflict is resolved.

The developer may compare code differences by using a difference checking (Diff) tool, to manually determine and resolve a conflict between code parties. However, in this process, a user needs to manually understand a change intention and objective of a code difference part. If a code change is relatively large, for example, a method body location change, format adjustment, or code reconstruction exists, the change intention or objective of the code difference part is very difficult, and efficiency is very low.

SUMMARY

This disclosure provides a collaborative architecture-based code conflict resolution system. A remote user is introduced to perform collaborative processing on a conflict resolution result obtained through local resolution, so that resolution efficiency and resolution quality can be improved. This disclosure further provides a corresponding method, apparatus, device, storage medium, and computer program product.

According to a first aspect, this disclosure provides a code conflict resolution system. The system includes a local apparatus, a service apparatus, and a remote apparatus. The local apparatus is configured to: perform resolution on a conflict field generated by code files of a plurality of versions, and send a conflict resolution result to the service apparatus. The conflict field includes at least one conflict block, and the conflict resolution result includes at least one of a resolution result of a local resolvable conflict block and an identifier of a local irresolvable conflict block. The remote apparatus is configured to: obtain the conflict resolution result from the service apparatus, and generate a collaborative processing window based on the conflict resolution result. A remote user may process the conflict resolution result based on the collaborative processing window, and the remote apparatus is further configured to receive a result of processing the conflict resolution result by the remote user based on the collaborative processing window.

This system not only supports a local user in automatically performing resolution on the conflict field by using the local apparatus, but also supports the remote user in performing, at a remote end by using the remote apparatus, collaborative processing on the conflict resolution result obtained through local resolution. Therefore, resolution efficiency and resolution accuracy are improved.

With reference to the first aspect, in a first implementation of the first aspect, the local apparatus may recommend a user to the service apparatus to participate in code conflict resolution in a remote manner. The user recommended by the local apparatus may be a default user prestored in the local apparatus, a friend user of the local user, or a user that belongs to a same group as the local user.

In implementation, the local apparatus may first determine a user identifier of the recommended user, and then send the user identifier of the recommended user to the service apparatus, such as a user name, an account, or an email of the recommended user. The user identifier of the recommended user corresponds to the remote apparatus. Based on this, the service apparatus may further send a collaborative resolution message to the remote apparatus based on the user identifier of the recommended user and the correspondence between the user identifier of the recommended user and the remote apparatus. The collaborative resolution message indicates the recommended user to process the conflict resolution result based on the collaborative processing window.

With reference to the first aspect or the first implementation of the first aspect, in a second implementation of the first aspect, when the at least one conflict block included in the conflict field includes the local resolvable conflict block, the conflict resolution result includes the resolution result of the local resolvable conflict block. The remote user may further confirm the resolution result of the local resolvable conflict block by using code segments that are displayed in the collaborative processing window of the remote apparatus and that are of the local resolvable conflict block before and after resolution. Correspondingly, the remote apparatus may receive a result of confirming the resolution result of the local resolvable conflict block by the remote user, and send, to the service apparatus, the result of confirming the resolution result of the local resolvable conflict block.

In the system, the remote user is introduced to perform collaborative confirmation on the resolution result of the local resolvable conflict block, so that a limitation of automatic resolution of the local apparatus can be overcome, and resolution accuracy can be improved.

With reference to the first aspect or the first implementation and the second implementation of the first aspect, in a third implementation of the first aspect, when the at least one conflict block included in the conflict field includes the local irresolvable conflict block, the conflict resolvable result includes the identifier of the local irresolvable conflict block. The remote apparatus may obtain the local irresolvable conflict block from the local apparatus based on the identifier of the local irresolvable conflict block. The remote user may resolve the local irresolvable conflict block by using the code segments that are displayed in the collaborative processing window of the remote apparatus and that are of the local irresolvable conflict block. Correspondingly, the remote apparatus may receive the result of resolving the local irresolvable conflict block by the remote user, and send the resolution result of the local irresolvable conflict block to the service apparatus.

In the system, the remote user is introduced to perform collaborative resolution on the local irresolvable conflict block, so that resolution efficiency and resolution accuracy can be improved. In addition, the remote apparatus obtains the local irresolvable conflict block from the local apparatus, to support the remote user in performing collaborative resolution, thereby avoiding a security risk caused when code of the remote apparatus is propagated in the service apparatus, and improving security.

With reference to any one of the first implementation to the third implementation of the first aspect, in a fourth implementation of the first aspect, considering that an author of the conflict block is familiar with a code segment of the conflict block, and can quickly understand a code change intention and objective, the local apparatus may determine the author of the conflict block as the recommended user. The author of the conflict block confirms the resolution result of the local resolvable conflict block, and resolves the local irresolvable conflict block. In this way, resolution accuracy and resolution efficiency can be further improved.

In implementation, the local apparatus is further configured to obtain author information of the conflict block, where the author information includes at least an author identifier. The local apparatus determines the user identifier of the recommended user based on the author identifier of the conflict block. For example, the local apparatus may directly determine the author identifier of the conflict block as the user identifier of the recommended user.

It should be noted that the author information may further include other information related to the author, such as an edition time of the author. The local apparatus may further perform screening based on the edition time of the author, to determine the recommended user.

With reference to any one of the second implementation to the fourth implementation of the first aspect, in a fifth implementation of the first aspect, the local apparatus is configured to resolve the at least one conflict block according to a resolution rule, to obtain the resolution result of the local resolvable conflict block. The service apparatus is further configured to update a confidence of the resolution rule based on the result of confirming the resolution result of the local resolvable conflict block by the remote user. In this way, the code conflict resolution system can be automatically optimized with a user use process, thereby ensuring code conflict resolution quality.

With reference to any one of the third implementation to the fifth implementation of the first aspect, in a sixth implementation of the first aspect, the local apparatus is configured to resolve the at least one conflict block according to the resolution rule, to obtain the identifier of the local irresolvable conflict block. The service apparatus is further configured to update the resolution rule based on the result of resolving the local irresolvable conflict block by the remote user. For example, the service apparatus may add a new resolution rule or modify an existing resolution rule based on the result of resolving the local irresolvable conflict block by the remote user. In this way, automation of code conflict resolution can be improved.

With reference to the fifth implementation or the sixth implementation of the first aspect, in a seventh implementation of the first aspect, considering that the local apparatus may obtain the resolution rule from the service apparatus to perform automatic resolution, the service apparatus may further make the resolution rule offline when the confidence of the resolution rule is less than a preset confidence threshold. In this way, the local apparatus may obtain a resolution rule with a relatively high confidence to perform automatic resolution, thereby ensuring accuracy of automatic resolution by the local apparatus.

With reference to any one of the first aspect, or the first implementation to the seventh implementation of the first aspect, in an eighth implementation of the first aspect, the collaborative processing window may present a code segment of the local resolvable conflict block and/or a code segment of the local irresolvable conflict block in a form of a web page.

The service apparatus may generate a source file of a collaborative processing page based on the conflict resolution result by using a web page development tool and technology. Correspondingly, the remote apparatus may obtain the source file of the collaborative processing page, generate the collaborative processing window based on the source file of the collaborative processing page, and display the collaborative processing window. The collaborative processing window includes the collaborative processing page.

The remote apparatus may directly generate the collaborative processing window by using the source file of the collaborative processing page, and can adapt to various platforms, such as a WINDOWS platform, an ANDROID platform, and an IOS platform. This has better compatibility.

With reference to any one of the first aspect, or the first implementation to the seventh implementation of the first aspect, in a ninth implementation of the first aspect, the collaborative processing window may alternatively present a code segment of the local resolvable conflict block and/or a code segment of the local irresolvable conflict block by using a user interface of the collaborative processing tool.

The remote apparatus, the local apparatus, and the service apparatus may form one collaborative processing tool. The remote apparatus obtains the conflict resolution result from the service apparatus, generates the collaborative processing window based on the conflict resolution result, and displays the collaborative processing window. The collaborative processing window includes the user interface of the collaborative processing tool.

Because the remote apparatus does not need to load the user interface of the collaborative processing tool from a network, a network access speed is less limited, and code conflict resolution fluency is improved, thereby improving user experience.

According to a second aspect, this disclosure provides a code conflict resolution method. The method may be applied to a local apparatus, and includes the following steps:

The local apparatus performs resolution on a conflict field generated by code files of a plurality of versions, to obtain a conflict resolution result, where the conflict field includes at least one conflict block, and the conflict resolution result includes at least one of a resolution result of a local resolvable conflict block and an identifier of a local irresolvable conflict block.

The local apparatus sends the conflict resolution result to a service apparatus.

With reference to the second aspect, in a first implementation of the second aspect, the method further includes:

The local apparatus determines a user identifier of a recommended user, and sends the user identifier of the recommended user to the service apparatus, so that the service apparatus sends a collaborative resolution message to a remote apparatus based on the user identifier of the recommended user, where the collaborative resolution message indicates the recommended user to process the conflict resolution result based on a collaborative processing window.

With reference to the first implementation of the second aspect, in a second implementation of the second aspect, the method further includes:

The local apparatus obtains author information of the conflict block.

The local apparatus determines the user identifier of the recommended user based on the author information of the conflict block.

According to a third aspect, this disclosure provides a code conflict resolution method. The method may be applied to a service apparatus, and includes the following steps:

The service apparatus receives a conflict resolution result for a conflict field that is sent by a local apparatus, where the conflict field is generated by combining code files of a plurality of versions, the conflict field includes at least one conflict block, and the conflict resolution result includes at least one of a resolution result of a local resolvable conflict block and an identifier of a local irresolvable conflict block.

The service apparatus stores the conflict resolution result, to provide the conflict resolution result to a remote apparatus.

With reference to the third aspect, in a first implementation of the third aspect, the method further includes:

The service apparatus receives a user identifier of a recommended user that is sent by the local apparatus.

The service apparatus sends a collaborative resolution message to the remote apparatus based on the user identifier of the recommended user, where the collaborative resolution message indicates the recommended user to process the conflict resolution result based on the collaborative processing window.

With reference to the third aspect or the first implementation of the third aspect, in a second implementation of the third aspect, the conflict resolution result includes the resolution result of the local resolvable conflict block.

The method further includes: The service apparatus receives a result that is of confirming the resolution result of the local resolvable conflict block by a remote user and that is sent by the remote apparatus.

With reference to the third aspect or the first implementation and the second implementation of the third aspect, in a third implementation of the third aspect, the conflict resolution result includes the identifier of the local irresolvable conflict block.

The method further includes: The service apparatus receives a result that is of resolving the local irresolvable conflict block by the remote user and that is sent by the remote apparatus.

With reference to the second implementation or the third implementation of the third aspect, in a fourth implementation of the third aspect, the resolution result of the local resolvable conflict block is obtained by the local apparatus by resolving the at least one conflict block according to a resolution rule.

The method further includes: The service apparatus updates a confidence of the resolution rule based on the result of confirming the resolution result of the local resolvable conflict block by the remote user.

With reference to the third implementation or the fourth implementation of the third aspect, in a fifth implementation of the third aspect, the identifier of the local irresolvable conflict block is obtained by the local apparatus by resolving the at least one conflict block according to the resolution rule.

The method further includes: The service apparatus updates the resolution rule based on the result of resolving the local irresolvable conflict block by the remote user.

According to a fourth aspect, this disclosure provides a code conflict resolution method. The method may be applied to a remote apparatus, and includes the following steps:

The remote apparatus obtains a conflict resolution result for a conflict field from a service apparatus, where the conflict field is generated by combining code files of a plurality of versions, the conflict field includes at least one conflict block, and the conflict resolution result includes at least one of a resolution result of a local resolvable conflict block and an identifier of a local irresolvable conflict block.

The remote apparatus generates a collaborative processing window based on the conflict resolution result, and receives a result of processing the conflict resolution result by a remote user based on the collaborative processing window.

With reference to the fourth aspect, in a first implementation of the fourth aspect, the method further includes:

The remote apparatus receives a collaborative resolution message sent by the service apparatus based on a user identifier of a recommended user, where the collaborative resolution message indicates the recommended user to process the conflict resolution result based on the collaborative processing window.

With reference to the fourth aspect or the first implementation of the fourth aspect, in a second implementation of the fourth aspect, the conflict resolution result includes the resolution result of the local resolvable conflict block, and the result of processing the conflict resolution result by the remote user based on the collaborative processing window includes a result of confirming the resolution result of the local resolvable conflict block by the remote user.

The method further includes: The remote apparatus sends, to the service apparatus, the result of confirming the resolution result of the local resolvable conflict block.

With reference to the fourth aspect or the first implementation and the second implementation of the fourth aspect, in a third implementation of the fourth aspect, the conflict resolution result includes the identifier of the local irresolvable conflict block, and the result of processing the conflict resolution result by the remote user based on the collaborative processing window includes a result of resolving the local irresolvable conflict block by the remote user.

The method further includes: The remote apparatus obtains the local irresolvable conflict block from the local apparatus based on the identifier of the local irresolvable conflict block, and sends the resolution result of the local irresolvable conflict block to the service apparatus.

According to a fifth aspect, this disclosure provides a local apparatus. The local apparatus includes modules configured to perform the code conflict resolution method in any one of the second aspect or the possible implementations of the second aspect.

According to a sixth aspect, this disclosure provides a service apparatus. The service apparatus includes modules configured to perform the code conflict resolution method in any one of the third aspect or the possible implementations of the third aspect.

According to a seventh aspect, this disclosure provides a remote apparatus. The remote apparatus includes modules configured to perform the code conflict resolution method in any one of the fourth aspect or the possible implementations of the fourth aspect.

According to an eighth aspect, this disclosure provides a computer. The computer includes a processor and a memory. The processor and the memory communicate with each other. The processor is configured to execute instructions stored in the memory, to perform the code conflict resolution method in any one of the second aspect or the implementations of the second aspect.

According to a ninth aspect, this disclosure provides a computer. The computer includes a processor and a memory. The processor and the memory communicate with each other. The processor is configured to execute instructions stored in the memory, to perform the code conflict resolution method in any one of the third aspect or the implementations of the third aspect.

According to a tenth aspect, this disclosure provides a computer. The computer includes a processor and a memory. The processor and the memory communicate with each other. The processor is configured to execute instructions stored in the memory, to perform the code conflict resolution method in any one of the fourth aspect or the implementations of the fourth aspect.

According to an eleventh aspect, this disclosure provides a computer-readable storage medium. The computer-readable storage medium stores instructions, and when the instructions are run on a computer, the computer is enabled to perform the method in any one of the second aspect or the implementations of the second aspect.

According to a twelfth aspect, this disclosure provides a computer-readable storage medium. The computer-readable storage medium stores instructions, and when the instructions are run on a computer, the computer is enabled to perform the method in any one of the third aspect or the implementations of the third aspect.

According to a thirteenth aspect, this disclosure provides a computer-readable storage medium. The computer-readable storage medium stores instructions; and when the instructions are run on a computer, the computer is enabled to perform the method in any one of the fourth aspect or the embodiments in the fourth aspect.

According to a fourteenth aspect, this disclosure provides a computer program product including instructions, and when the computer program product runs on a computer, the computer is enabled to perform the method in any one of the second aspect or the embodiments in the second aspect.

According to a fifteenth aspect, this disclosure provides a computer program product including instructions, and when the computer program product runs on a computer, the computer is enabled to perform the method in any one of the third aspect or the embodiments in the third aspect.

According to a sixteenth aspect, this disclosure provides a computer program product including instructions, and when the computer program product runs on a computer, the computer is enabled to perform the method in any one of the fourth aspect or the embodiments in the fourth aspect.

In this disclosure, based on the implementations provided in the foregoing aspects, the implementations may be further combined to provide more implementations.

BRIEF DESCRIPTION OF DRAWINGS

FIG. 7 is a schematic diagram of confirming a resolution result of a local resolvable conflict block according to an embodiment of this disclosure;

FIG. 8 is a schematic diagram of resolving a local irresolvable conflict block according to an embodiment of this disclosure;

DETAILED DESCRIPTION OF EMBODIMENTS

Figure 1:
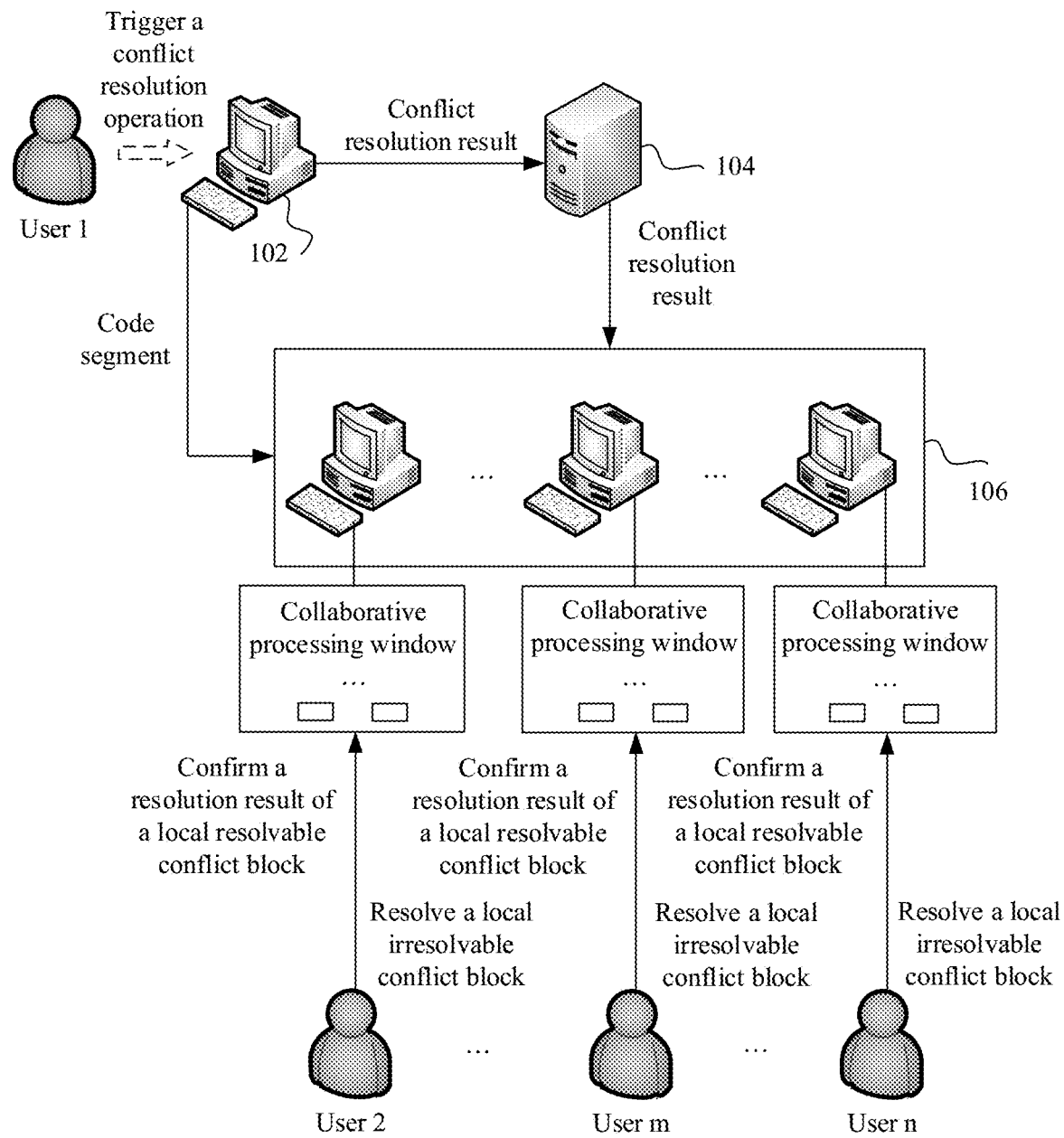
FIG. 1 is a schematic diagram of a structure of a code conflict resolution system according to an embodiment of this disclosure.

In a multi-user collaborative development scenario, different users modify code files of a same version, such as a code file of a basic version (referred to as Base in the accompanying drawings of this disclosure), to obtain code files of different versions. A user having merge permission, such as a user who modifies the code file of the basic version or a project administrator of the collaborative development project, may trigger a merge operation on the code files of the different versions.

Every two of the code files of the different versions are merged. To be specific, code files of two versions are first merged. When there are more than two versions, a merged code file is further merged with a code file of a next version, until the code files of all the versions are merged.

For ease of description, two versions merged each time may be referred to as a current version (referred to as Ours in the accompanying drawings of this disclosure) and a to-be-merged version (referred to as Theirs in the accompanying drawings of this disclosure). Merging the current version and the to-be-merged version is merging the to-be-merged version into the current version. Both the current version and the to-be-merged version are versions obtained by modifying the basic version. For ease of understanding, the following provides descriptions with reference to examples.

In some examples, when a plurality of users collaboratively develops a project, a code warehouse for the project may be first created on a network side (for example, a server), and the code warehouse stores a code file of a basic version. A plurality of users in a project group may pull the code file of the basic version in the code warehouse to a local location. Different features are separately developed on the code file of the basic version to obtain code files of different versions. Each user may push a code file of a modified version to the code warehouse on the network side. When a user wants to merge a code file of a version modified by another user, a code file of a corresponding version may be obtained from the code warehouse, to serve as a code file of a to-be-merged version, and a local code file is used as a code file of a current version to merge the code file of the current version and the code file of the to-be-merged version. Certainly, the user may alternatively merge local code files of two versions. In this case, the user may determine, based on an actual requirement, that one version of the two versions is a current version and the other version is a to-be-merged version.

When the code file of the current version is merged with the code file of the to-be-merged version, if modifications of the two versions relative to the basic version are different, it is considered that a code conflict occurs. A basic code segment, a current code segment, and a to-be-merged code segment that correspond to each difference form a conflict block. A code file of each version includes at least one file, at least one conflict block formed by all differences between modifications of one file in the code file of the current version and one file in the code file of the to-be-merged version relative to one file in the code file of the basic version forms one conflict file, and a set of all conflict files generated in one merge is referred to as a conflict field of the current merge. A conflict field of one-time merge includes at least one conflict file generated by the current merge, and each conflict file includes at least one conflict block.

When a code conflict occurs in the code files of the different versions, the conflict field needs to be resolved to complete merge of the code files of the different versions. The code conflict is a difference between modifications of the code files of the different versions relative to a same code segment in the code file of the basic version. For example, the current version modifies a parameter of a code segment in the code file of the basic version into one value, and the to-be-merged version modifies the parameter into another value. Correspondingly, resolution is eliminating or resolving a conflict. That is, the difference between the modifications of the code files of the different versions relative to the same code segment in the code file of the basic version is eliminated, to indicate modification of a code file of a merged version relative to the same code segment in the code file of the basic version. For example, the code segment in the code file of the basic version may be modified by modifying the code file of the current version or the code file of the to-be-merged version, to obtain a code segment of the merged version.

Currently, in a mainstream code conflict resolution method in the industry, a single user compares code differences by using a Diff tool, and then manually understands a code change intention, to implement conflict resolution. The foregoing conflict resolution method is generally performed only locally. Consequently, resolution efficiency is low, and resolution quality cannot be ensured.

Based on this, an embodiment of this disclosure provides a code conflict resolution system. A local apparatus first performs resolution on a conflict field. Then, by using a remote apparatus, a remote user collaboratively confirms a conflict block resolved by the local apparatus, and collaboratively resolves a conflict block that is not resolved by the local apparatus, thereby improving conflict resolution quality and conflict resolution efficiency. The system further supports recommendation of a user participating in collaborative resolution based on author information of the conflict block, thereby further improving conflict resolution quality and resolution efficiency. In addition, the system may further update, based on a result that is of confirming a resolution result of the conflict block and that is fed back by the remote apparatus, a confidence of a resolution rule used by the local apparatus during automatic resolution, thereby improving precision of automatic resolution by the local apparatus. In addition, the local apparatus does not need to share a code file to a network, thereby reducing a risk of code disclosure and ensuring security of code conflict resolution. An embodiment of this disclosure further provides a corresponding code conflict resolution method, apparatus, device, readable storage medium, and computer program product.

The following describes the embodiments of this disclosure with reference to accompanying drawings.

In the specification, claims, and accompanying drawings of this disclosure, the terms such as "first" and "second" are intended to distinguish between similar objects but do not necessarily indicate a specific order or sequence. It should be understood that the terms used in such a way are interchangeable in proper circumstances. This is merely a distinguishing manner that is used when objects having a same attribute are described in the embodiments of this disclosure.

First, refer to a diagram of a structure of a code conflict resolution system shown in FIG. 1. The code conflict system includes a local apparatus 102, a service apparatus 104, and at least one remote apparatus 106. A computer on which the local apparatus 102 and the remote apparatus 106 are deployed may be a desktop computer, a laptop computer, a smartphone, a cloud server, or the like. The computer on which the service apparatus 104 is deployed may be a server, such as a cloud server. The local apparatus 102 may alternatively be deployed on a same computer as the service apparatus 104.

When code conflict resolution is performed, the local apparatus 102 first performs resolution on a conflict field generated by code files of a plurality of versions. In implementation, a local user such as a user 1 may trigger a conflict resolution operation on the conflict field by using a graphical user interface (GUI) or a command line interface (CLI) of the local apparatus 102. The local apparatus 102 may invoke, in response to the foregoing conflict resolution operation, a prestored resolution rule to perform automatic resolution on the conflict field. The conflict field includes a local resolvable conflict block that can be automatically resolved by the local apparatus 102, that is, a local resolvable conflict block. The local apparatus 102 automatically resolves the local resolvable conflict block to obtain a resolution result of the local resolvable conflict block.

In some cases, the conflict field further includes a conflict block that cannot be resolved by the local apparatus 102, that is, a local irresolvable conflict block. The local apparatus 102 may generate, based on the resolution result of the local resolvable conflict block and an identifier of the local irresolvable conflict block, a conflict resolution result corresponding to the conflict field.

When each conflict block included in the conflict field is a local resolvable conflict block, the local apparatus 102 may generate a conflict resolution result based on a resolution result of the local resolvable conflict block. When each conflict block included in the conflict field is a local irresolvable conflict block, the local apparatus 102 may generate a conflict resolution result based on an identifier of the local irresolvable conflict block. That is, the conflict resolution result may include at least one of the resolution result of the local resolvable conflict block and the identifier of the local irresolvable conflict block. For ease of description, this disclosure is described by using an example in which a conflict block includes a local resolvable conflict block and a local irresolvable conflict block, and a conflict resolution result includes a resolution result of the local resolvable conflict block and an identifier of the local irresolvable conflict block.

An identifier of a conflict block may include a line number of the conflict block in a conflict file. A resolution result of a conflict block may be represented by an identifier of the conflict block (for example, a line number of the conflict block before resolution in the conflict file and a line number of the conflict block after resolution in the conflict file) and a resolution status of the conflict block. Based on this, the conflict resolution result may include an identifier of each conflict block and a resolution status of each conflict block. After obtaining the conflict resolution result corresponding to the conflict field, the local apparatus 102 sends the conflict resolution result to the service apparatus 104.

The remote apparatus 106 obtains the conflict resolution result corresponding to the conflict field from the service apparatus 104, generates a collaborative processing window based on the conflict resolution result, and displays the collaborative processing window. The collaborative processing window displays a code segment that is of the local resolvable conflict block before resolution and that is obtained from the local apparatus 102 based on an identifier of the local resolvable conflict block, a code segment that is of the local resolvable conflict block after resolution and that is obtained from the local apparatus 102 based on the identifier of the local resolvable conflict block, and a code segment that is of the local irresolvable conflict block and that is obtained from the local apparatus 102 based on the identifier of the local irresolvable conflict block. In this way, a remote user, such as any one or more of a user 2 to a user n, may perform collaborative processing on the conflict resolution result based on the foregoing collaborative processing window. The remote apparatus 106 may receive a result of processing the conflict resolution result by the remote user based on the collaborative processing window. The processing result may include a result of confirming the resolution result of the local resolvable conflict block by the remote user, and a result of resolving the local irresolvable conflict block by the remote user. It should be noted that this disclosure is described by using an example in which a conflict block includes a local resolvable conflict block and a local irresolvable conflict block.

When each conflict block is a local resolvable conflict block, the conflict resolution result includes a resolution result of the local resolvable conflict block. The remote apparatus 106 displays a code segment of the local resolvable conflict block before resolution and a code segment of the local resolvable conflict block after resolution in the collaborative processing window. The remote user confirms the resolution result of the local resolvable conflict block based on the code segment. In this way, the result of processing the conflict resolution result by the remote user based on the collaborative processing window includes the result of confirming the resolution result of the local resolvable conflict block by the remote user.

When each conflict block is a local irresolvable conflict block, the conflict resolution result includes an identifier of the local irresolvable conflict block. The remote apparatus 106 obtains the local irresolvable conflict block from the local apparatus 102 based on the identifier of the local irresolvable conflict block, and displays a code segment of the local irresolvable conflict block in the collaborative processing window. The remote user resolves the local irresolvable conflict block based on the code segment. In this way, the result of processing the conflict resolution result by the remote user based on the collaborative processing window includes the result of resolving the local irresolvable conflict block by the remote user. The remote apparatus 106 obtains the local irresolvable conflict block from the local apparatus 102, to avoid a security risk caused when code of the remote apparatus 106 is propagated in the service apparatus 104, and improve security.

The local user is a user who triggers a conflict resolution operation in the local apparatus 102, and the remote user is a user who participates in conflict resolution by using the remote apparatus 106, that is, a user who assists the local user in performing resolution on the conflict field by using the collaborative processing window. When any one of the user 2 to the user n, such as the user m, triggers a conflict resolution operation, the user m is a local user, and the user 1 and the user other than the user m in the user 2 to the user n participate in conflict resolution in a remote manner. In this case, the user 1 and the user other than the user m in the user 2 to the user n may be considered as remote users.

In actual application, the collaborative processing window may present the code segment of the local resolvable conflict block before resolution, the code segment of the local resolvable conflict block after resolution, and the code segment of the local irresolvable conflict block in a web page manner. The service apparatus 104 may generate a source file (that is, a source code file) of a collaborative processing page based on the resolution result of the local resolvable conflict block and the identifier of the local irresolvable conflict block. The remote apparatus 106 may obtain the source file of the collaborative processing page from the service apparatus, generate the collaborative processing window based on the source file, where the collaborative processing window includes the collaborative processing page, and display the collaborative processing window, so that the code segment of the local resolvable conflict block before resolution, the code segment of the local resolvable conflict block after resolution, and the code segment of the local irresolvable conflict block are presented by using the collaborative processing page in the collaborative processing window.

The collaborative processing window may alternatively present the code segment of the local resolvable conflict block before resolution, the code segment of the local resolvable conflict block after resolution, and the code segment of the local irresolvable conflict block by using a user interface of a collaborative processing tool. The remote apparatus 106, the local apparatus 102, and the service apparatus 104 may constitute one collaborative processing tool that supports remote conflict resolution. The remote apparatus 106 may obtain, from the service apparatus 104, the conflict resolution result corresponding to the conflict field, and then generate the collaborative processing window based on the resolution result of the local resolvable conflict block and the identifier of the local irresolvable conflict block. The user interface of the collaborative processing tool is drawn in the collaborative processing window. A visible area of the user interface includes the code segment that is of the local resolvable conflict block before resolution and that is obtained based on the identifier of the local resolvable conflict block, the code segment that is of the local resolvable conflict block after resolution and that is obtained based on the identifier of the local resolvable conflict block, and the code segment that is of the local irresolvable conflict block and that is obtained based on the identifier of the local irresolvable conflict block. Then, the remote apparatus 106 displays the collaborative processing window, so that the foregoing code segments are presented by using the user interface displayed in the collaborative processing window.

To simplify a user operation and improve resolution efficiency, the remote apparatus 106 may further display a conflict file directory tree in the collaborative processing window, and provide a navigation function for a conflict block in each conflict file based on the conflict file directory tree. The remote user may quickly jump to any conflict block based on the conflict file directory tree by using the navigation function.

It should be noted that the foregoing collaborative processing window may be presented in a form of one window. The collaborative processing window may alternatively be presented in a form of two or more windows, such as a confirmation window and a resolution window. If all conflict blocks included in the conflict field are local resolvable conflict blocks, the collaborative processing window may include only a confirmation window. If all conflict blocks included in the conflict field are local irresolvable conflict blocks, the collaborative processing window may include only a resolution window. This disclosure is described by using an example in which the collaborative processing window includes a confirmation window and a resolution window.

The confirmation window supports the remote user in confirming the resolution result of the local resolvable conflict block, and the resolution window supports the remote user in resolving the local irresolvable conflict block. The service apparatus 104 may provide a confirmation window and a resolution window for the remote user, so that the remote user can not only confirm the resolution result of the local resolvable conflict block, but also can resolve the local irresolvable conflict block. The service apparatus 104 may provide only a confirmation window for some remote users, and provide only a resolution window for some other remote users. In this case, some remote users can confirm the resolution result of the local resolvable conflict block based on the confirmation window, and some other remote users can resolve the local irresolvable conflict block based on the resolution window, so as to implement isolation of accessible code segments of the remote users, thereby reducing a security risk caused by code propagation.

The following describes in detail three apparatuses related to the foregoing code conflict resolution system.

Figure 2:
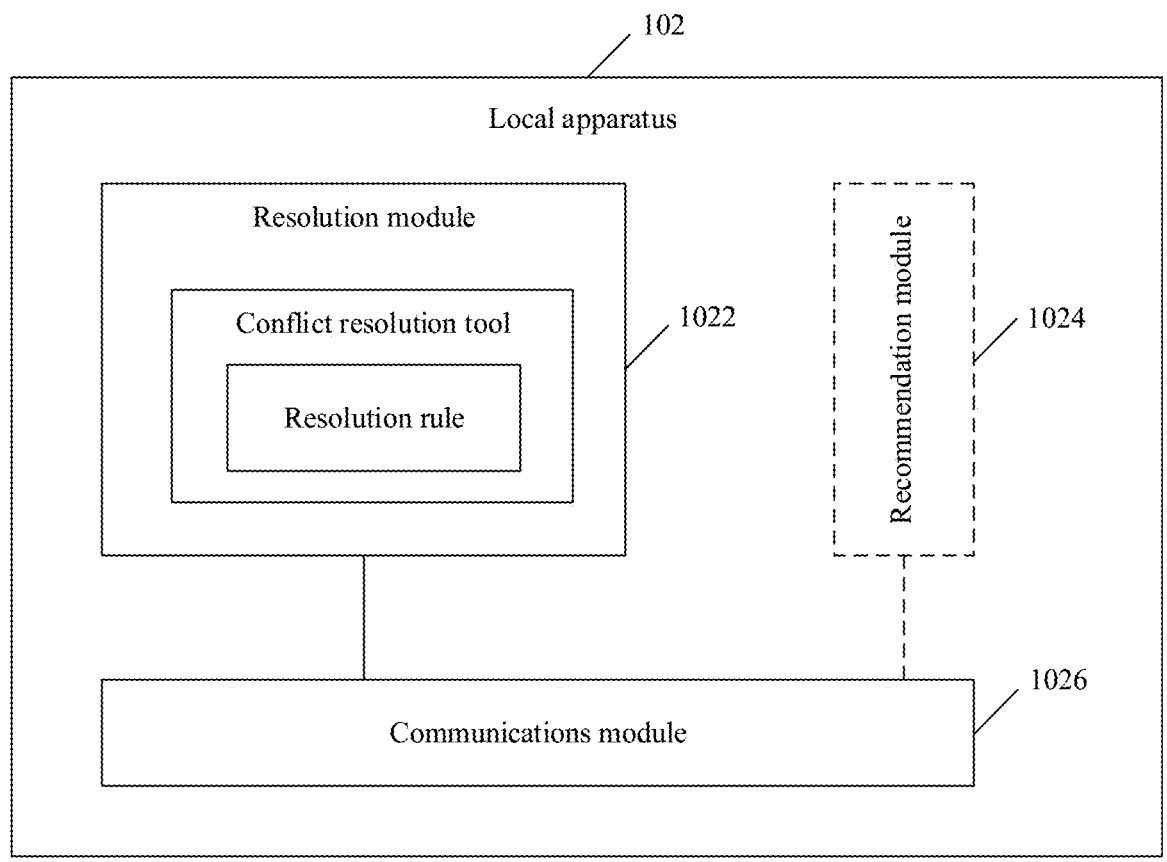
FIG. 2 is a schematic diagram of a structure of a local apparatus according to an embodiment of this disclosure.

FIG. 2 is a schematic diagram of a structure of the local apparatus 102. The apparatus 102 includes a resolution module 1022 and a communications module 1024. The resolution module 1022 is configured to perform resolution on a conflict field generated by code files of a plurality of versions, to obtain a conflict resolution result. The communications module 1024 is configured to send the conflict resolution result to the service apparatus 104.

A conflict resolution tool is deployed in the resolution module 1022. When performing resolution on the conflict field, the resolution module 1022 invokes the conflict resolution tool, and obtains a resolution rule from the service apparatus 104 by using the conflict resolution tool, or obtains a resolution rule locally prestored in the conflict resolution tool. The resolution module 1022 resolves each conflict block by using the obtained resolution rule, and determines each conflict block as a local resolvable conflict block or a local irresolvable conflict block. For a local resolvable conflict block, the resolution module 1022 records a state of the local resolvable conflict block and an identifier of the local resolvable conflict block as a resolution result of the local resolvable conflict block. For a local irresolvable conflict block, the resolution module 1022 records an identifier of the local irresolvable conflict block. After processing each conflict block in the conflict field, the resolution module 1022 generates, based on the resolution result of the local resolvable conflict block and the identifier of the local resolvable conflict block, the conflict resolution result corresponding to the conflict field.

A state of a conflict block is used to indicate whether the conflict block is resolved. In actual application, the resolution module 1022 may represent different states of the conflict block by using different field values of a state field, for example, represent "resolved" by using a value 1, and represent "unresolved" by using a value 0.

An identifier of a conflict block may be represented by using a start line number and an end line number of the conflict block in a conflict file. For a local resolvable conflict block, start line numbers and end line numbers before and after resolution may change. Therefore, when recording an identifier of the local resolvable conflict block, the resolution module 1022 may record a start line number and an end line number of the local resolvable conflict block before resolution in the conflict file, and a start line number and an end line number of the local resolvable conflict block after resolution in the conflict file.

The code conflict resolution system further supports a recommendation module 1026 included in the local apparatus 102 in recommending a user participating in collaborative processing. In implementation, the recommendation module 1026 of the local apparatus 102 may determine a user identifier of a recommended user, and the communications module 1024 may further send the user identifier of the recommended user to the service apparatus 104. The recommended user may be a default user prestored in the recommendation module 1026, a friend user of a local user, a user that belongs to a same group as the local user, or the like. The user identifier may be any unique identifier of the user, for example, may be a user name, an account, or an email.

A user identifier of one recommended user may correspond to one remote apparatus 106. In some cases, user identifiers of a plurality of recommended users may correspond to one remote apparatus 106, that is, the plurality of recommended users are all users of the remote apparatus 106. The service apparatus 104 stores a correspondence between the user identifier of the recommended user and the remote apparatus 106. When receiving the user identifier of the recommended user, the service apparatus 104 may send a collaborative resolution message to the remote apparatus 106 based on the user identifier of the recommended user and the correspondence between the user identifier of the recommended user and the remote apparatus 106. In this way, the recommended user may open a collaborative processing window based on the collaborative resolution message, to perform remote resolution on the conflict field.

When the collaborative processing window is divided into a confirmation window and a resolution window, the recommendation module 1026 may further separately generate user identifiers of two groups of recommended users, and send the user identifiers of the two groups of recommended users to the service apparatus 104 by using the communications module 1024. The service apparatus 104 separately provides confirmation windows and resolution windows to the two groups of recommended users based on the user identifiers of the two groups of recommended users, so as to implement isolation of the recommended users and reduce a security risk caused by code propagation.

Because an author of the conflict block is familiar with code corresponding to the conflict block, the author can quickly understand a code change intention and objective, to confirm the local resolvable conflict block or resolve the local irresolvable conflict block. When determining the recommended user, the recommendation module 1026 may further determine the author of the conflict block as the recommended user, so as to improve resolution accuracy.

The recommendation module 1026 may obtain author information of the conflict block, for example, may analyze a code segment of the conflict block to obtain the author information of the code segment. The author information includes at least an author identifier, and the author identifier may be any one or more of a user name, an account, or an email of the author. The recommendation module 1026 may use the author identifier of the conflict block as the user identifier of the recommended user.

Further, the recommendation module 1026 may further determine a conflict block corresponding to each recommended user, and send a user identifier of each recommended user and a corresponding conflict block identifier to the service apparatus 104 by using the communications module 1024.

The following describes the service apparatus 104 in this disclosure with reference to embodiments. An implementation of the service apparatus 104 may vary with a presentation manner of the collaborative processing window.

In a possible implementation, the service apparatus 104 may be used as a data transit node of the local apparatus 102 and the remote apparatus 106, and provide, to the remote apparatus 106, the conflict resolution result for the conflict field that is sent by the local apparatus 102. The remote apparatus 106 generates the collaborative processing window based on the conflict resolution result for the conflict field, and presents a code segment of the local resolvable conflict block before resolution, a code segment of the local resolvable conflict block after resolution, and a code segment of the local irresolvable conflict block by using the user interface of the collaborative processing tool in the collaborative processing window, so that the user determines whether the resolution result of the local resolvable conflict block is correct, and resolves the local irresolvable conflict block.

Figure 3:
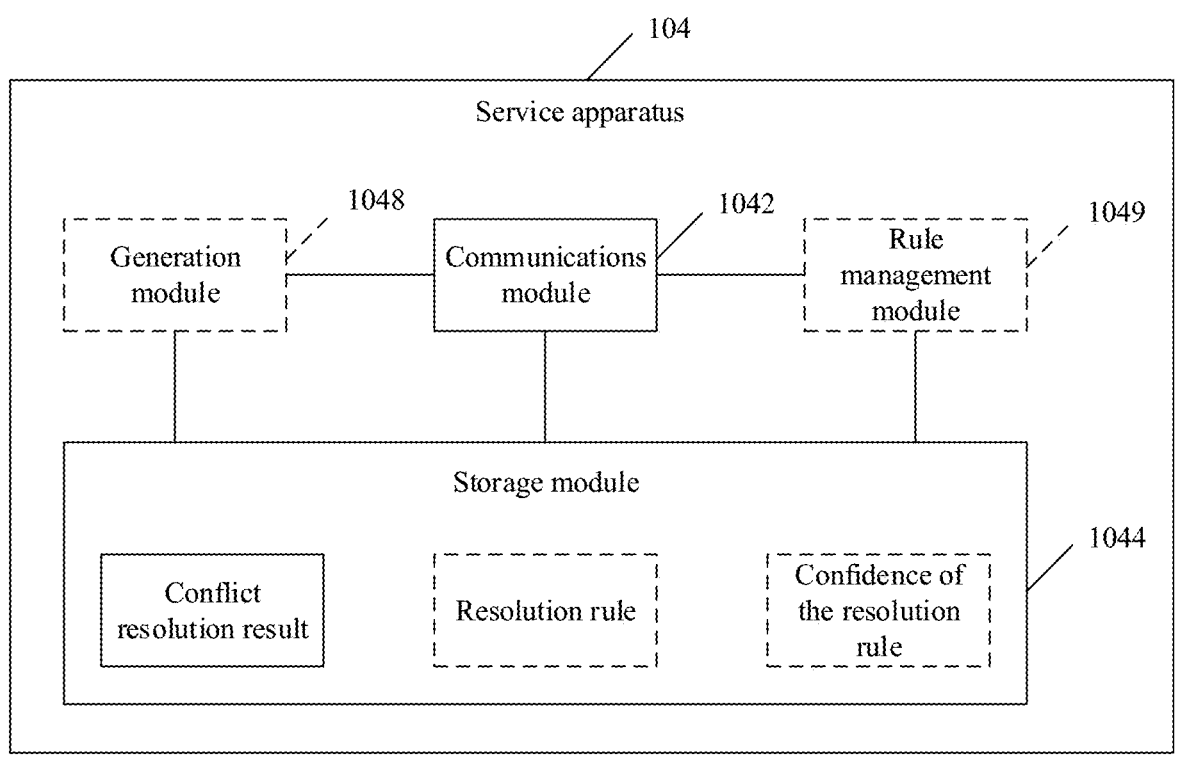
FIG. 3 is a schematic diagram of a structure of a service apparatus according to an embodiment of this disclosure.

FIG. 3 is a schematic diagram of a structure of the service apparatus 104. The apparatus 104 includes a communications module 1042 and a storage module 1044. The communications module 1042 is configured to receive a conflict resolution result sent by the local apparatus 102. The conflict resolution result includes a resolution result of a local resolvable conflict block and an identifier of a local irresolvable conflict block. The storage module 1044 is configured to store the conflict resolution result, for example, may write the conflict resolution result into a database through a representational state transfer (REST) interface, to provide the conflict resolution result to the remote apparatus 106.

In another possible implementation, considering that a remote user may perform remote resolution by accessing a web page by using a browser, the service apparatus 104 may generate a source file of a collaborative processing page based on a conflict resolution result for a conflict field that is sent by the local apparatus 102. The source file of the collaborative processing page includes the conflict resolution result for the conflict field. In this way, the remote apparatus 106 may obtain the source file of the collaborative processing page from the service apparatus 104, and generate a collaborative processing window based on the source file of the collaborative processing page. The collaborative processing window includes the collaborative processing page.

Figure 4:
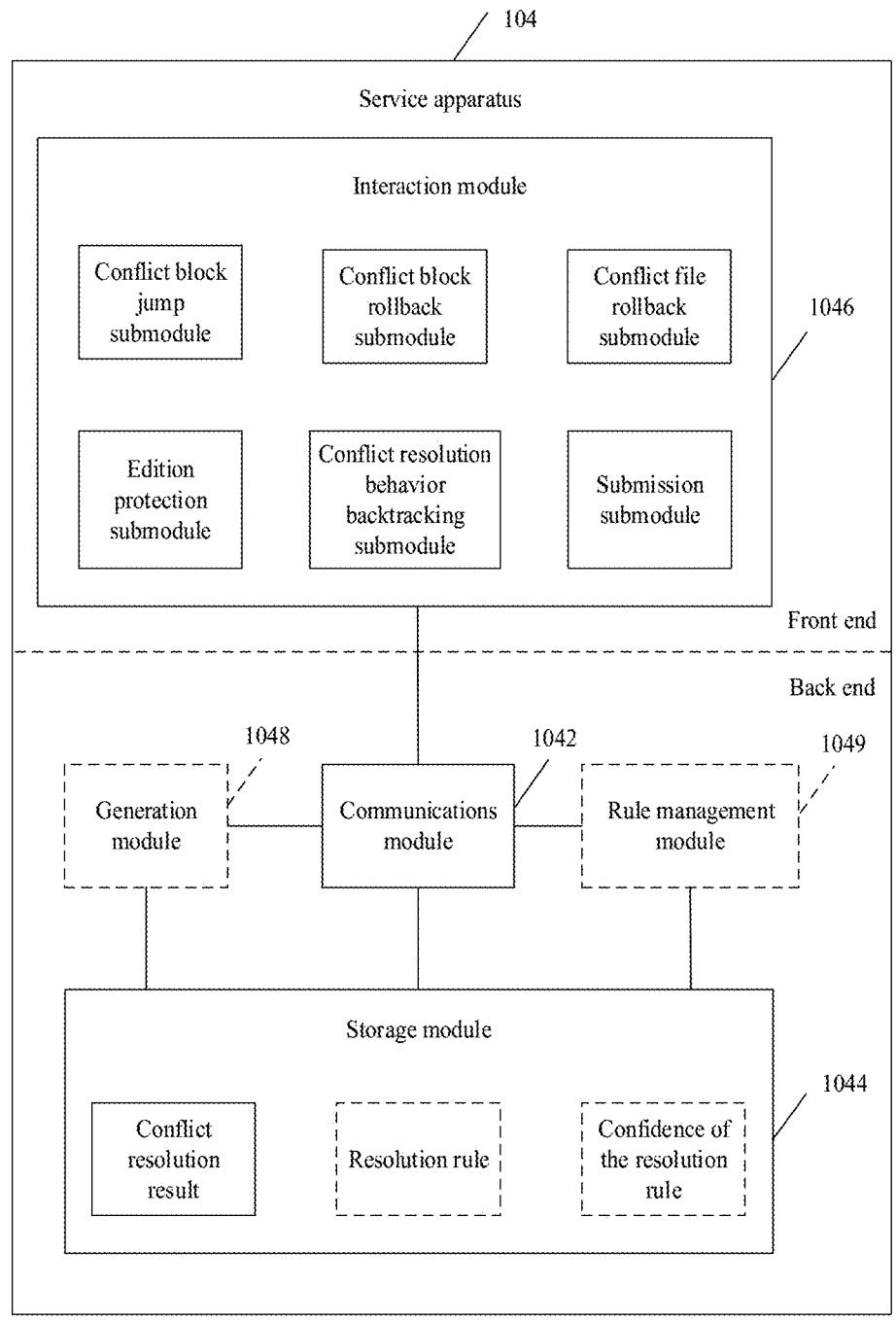
FIG. 4 is a schematic diagram of a structure of a service apparatus according to an embodiment of this disclosure.

FIG. 4 is a schematic diagram of a structure of the service apparatus 104. The service apparatus 104 may be implemented by using a front-end and back-end separation architecture. A front end is mainly responsible for interaction with a remote user, that is, generating a source file of a collaborative processing page, to interact with the remote user by using the collaborative processing page. A back end is mainly responsible for data processing, that is, processing data such as a conflict resolution result.

The back end of the service apparatus 104 includes a communications module 1042 and a storage module 1044. For implementation of the communications module 1042 and the storage module 1044, refer to related content descriptions in the embodiment shown in FIG. 3. The front end of the service apparatus 104 includes an interaction module 1046, and is configured to generate the source file of the collaborative processing page based on a resolution result of a local resolvable conflict block and an identifier of a local irresolvable conflict block in the conflict resolution result by using any one or more tools such as Hypertext Markup Language (HTML), a PHP: Hypertext Preprocessor (PHP), Java Server Pages (JSP), and Active Server Pages (ASP), to support the remote user in confirming the resolution result of the local resolvable conflict block and manually resolving the local irresolvable conflict block by using the collaborative processing page in a collaborative processing window.

The interaction module 1046 may include one or more of a conflict block jump submodule, a conflict block rollback submodule, a conflict file rollback submodule, an edition protection submodule, a conflict resolution behavior backtracking submodule, and a submission submodule.

The conflict block jump submodule is configured to display a conflict file directory tree and a conflict block navigation control in the collaborative processing window. The remote user may quickly jump between different conflict blocks based on the conflict file directory tree and the conflict block navigation control.

The conflict block rollback submodule is configured to roll back a conflict block to a state before resolution when the remote user confirms that an error occurs in conflict block resolution.

Similarly, the conflict file rollback submodule is configured to roll back a conflict file to a state before resolution when an error occurs in conflict file resolution. The state before the conflict file is resolved may be a state before the remote user manually resolves the conflict file, that is, a state after the local apparatus 102 automatically resolves the conflict file. The state before the conflict file is resolved may alternatively be a state before the local apparatus 102 automatically resolves the conflict file.

The edition protection submodule is configured to perform edition protection when a plurality of remote users edits a same conflict block, to avoid an edition conflict. The edition protection submodule may store a lock flag bit for each conflict block. When detecting that a specific remote user initiates an edition operation for a conflict block, the edition protection submodule reads a lock flag bit corresponding to the conflict block, and if the lock flag bit represents that the conflict block is locked, rejects the edition operation of the remote user for the conflict block, or if the lock flag bit represents that the conflict block is not locked, allows the edition operation of the remote user for the conflict block.

The edition protection submodule can also perform edition protection for a conflict file. When detecting that a specific remote user initiates an edition operation for a conflict file, the edition protection submodule reads a lock flag bit corresponding to the conflict file, and if the lock flag bit represents that the conflict file is locked, rejects the edition operation of the remote user for the conflict file, or if the lock flag bit represents that the conflict file is not locked, allows the edition operation of the remote user for the conflict file.

The edition operation of the remote user for the conflict block or the conflict file may be rejected in a plurality of implementations. In one implementation, edition permission of the remote user for the conflict block or the conflict file is set to "no editing". In this way, a processing control provided in the collaborative processing page or a user interface of a collaborative processing tool is unavailable, and the remote user cannot edit the conflict block or the conflict file based on the processing control. In another implementation, saving permission of the remote user for the conflict block or the conflict file is set to "no saving". Even if the remote user edits a code segment in the conflict block or the conflict file, the remote user cannot save a processing result, and therefore cannot send the processing result.

Further, when rejecting an edition operation of a specific remote user for a specific conflict block or a specific conflict file, the edition protection submodule may further obtain a user identifier corresponding to a user who edits the conflict block or the conflict file for the first time, and generate prompt information based on the user identifier, to prompt that the conflict block or the conflict file is being edited by another remote user.

In some possible implementations, if the user who edits the conflict block or the conflict file for the first time exits edition and releases the conflict block or the conflict file, a lock flag bit of the conflict block or the conflict file may be reset to a non-locked state. When detecting that the lock flag bit changes from a locked state to a non-locked state, the edition protection submodule may generate prompt information, to prompt that the conflict block or the conflict file is currently in an editable state. The communications module 1042 may obtain a user identifier of a rejected remote user, and send the prompt information to the rejected remote user based on a correspondence between the user identifier and the remote apparatus 106, to prompt the rejected remote user to edit the conflict block or the conflict file.

The conflict resolution behavior backtracking submodule is configured to record a valid operation of the remote user for a conflict block, to implement conflict resolution behavior backtracking. In implementation, a user identifier of the remote user, an identifier of the conflict block processed by the remote user, and an operation identifier of the valid operation of the remote user may be recorded. The valid operation may include operations such as insertion and deletion.

The submission submodule is configured to: after all conflict blocks in a conflict field are resolved, submit, in response to a submission operation triggered by a user with submission permission by using a submission control, code files obtained after all the conflict blocks in the conflict field are resolved.

In the embodiment shown in FIG. 3 or FIG. 4, the communications module 1042 is further configured to receive a user identifier of a recommended user that is sent by the local apparatus 102. Based on this, the service apparatus 104 may further include a generation module 1048. The generation module 1048 is configured to generate a collaborative resolution message based on the user identifier. Correspondingly, the communications module 1042 may further send the collaborative resolution message to the remote apparatus 106 based on the user identifier of the recommended user and a correspondence that is between the user identifier of the recommended user and the remote apparatus 106 and that is stored in the storage module 1044, to indicate the recommended user to process the conflict resolution result based on the collaborative processing window.

For the service apparatus 104 shown in FIG. 3, the collaborative resolution message may include the conflict resolution result for the conflict field. In this way, when receiving the collaborative resolution message, the remote apparatus 106 may generate the collaborative processing window based on the conflict resolution result for the conflict field. The collaborative processing window includes a user interface of a collaborative processing tool. The remote apparatus 106 displays the collaborative processing window, and presents a corresponding code segment by using the user interface in the collaborative processing window.

For the service apparatus 104 shown in FIG. 4, the collaborative resolution message may include a Uniform Resource Locator (URL) of the collaborative processing page. Further, the collaborative resolution message may indicate the recommended user to access the collaborative processing page, to confirm the resolution result of the local resolvable conflict block, and resolve the local irresolvable conflict block.

It should be noted that the generation module 1048 may generate different types of collaborative resolution messages for different types of user identifiers. For example, when the user identifier is a user name or an account, the generation module 1048 may generate the collaborative resolution message by using a system notification. When the user identifier is an email, the generation module 1048 may generate the collaborative resolution message by using an email.

In actual application, the storage module 1044 of the service apparatus 104 stores at least one resolution rule used for conflict resolution. When performing conflict resolution, the local apparatus 102 may obtain the resolution rule from the storage module 1044. To ensure resolution reliability, the storage module 1044 may further store a confidence of each resolution rule. The service apparatus 104 may further update the confidence of the resolution rule based on a result that is of confirming the resolution result of the local resolvable conflict block by the remote user and that is fed back by the remote apparatus 106.

In implementation, the service apparatus 104 may further include a rule management module 1049. When the communications module 1042 receives the result that is of confirming the resolution result of the local resolvable conflict block by the remote user and that is sent by the remote apparatus 106, the rule management module 1049 may update the confidence of the corresponding resolution rule in real time based on the confirmation result. Certainly, in some cases, the rule management module 1049 may update the confidence of the resolution rule in a manner such as periodic update. The storage module 1044 may store the confirmation result. In this way, the rule management module 1049 may periodically obtain the confirmation result from the database, and update the confidence of the corresponding resolution rule.

When storing the conflict resolution result, the storage module 1044 may further store an identifier of a resolution rule used for each local resolvable conflict block. In this way, when receiving the result of confirming the resolution result of the local resolvable conflict block, the communications module 1042 may search for a resolution rule corresponding to the confirmation result by matching an identifier of the local resolvable conflict block. When the confirmation result represents that the local resolvable conflict block is resolved correctly, the rule management module 1049 executes a confidence increase algorithm to increase a confidence of the corresponding resolution rule. Otherwise, the rule management module 1049 executes a confidence decrease algorithm to reduce a confidence of the corresponding resolution rule.

Further, when a confidence of any resolution rule is less than a preset confidence threshold, it indicates that a resolution result obtained by resolving the conflict block by using the resolution rule is relatively low, and the rule management module 1049 may further perform offline processing on the resolution rule. For example, the resolution rule is deleted from a rule list, or the resolution rule is temporarily or permanently disabled. In this way, the local apparatus 102 can be prevented from performing automatic resolution by using the resolution rule. The code conflict resolution system can be automatically optimized with a user use process, thereby ensuring code conflict resolution quality.

When the resolution module 1022 resolves at least one conflict block in the conflict field according to the resolution rule, to obtain the identifier of the local irresolvable conflict block, the communications module 1042 of the service apparatus 104 may further receive a result that is of resolving the local irresolvable conflict block by the remote user and that is sent by the remote apparatus 106. Further, the rule management module 1049 of the service apparatus 104 may further update the resolution rule based on the result of resolving the local irresolvable conflict block by the remote user.

The rule management module 1049 may perform machine learning for the result of resolving the local irresolvable conflict block by the remote user, to mining a resolution law, and add a new resolution rule or modify an existing resolution rule according to the resolution law, so as to update the resolution rule. It should be noted that, in some cases, the rule management module 1049 may further delete the existing resolution rule, to update the resolution rule.

The following describes the remote apparatus 106 in this disclosure with reference to embodiments. An implementation of the remote apparatus 106 may vary with a presentation manner of the collaborative processing window.

In a possible implementation, the remote apparatus 106 may obtain, from the service apparatus 104, the source file of the collaborative processing page generated based on the conflict resolution result, and generate the collaborative processing window based on the source file of the collaborative processing page. The collaborative processing window includes the collaborative processing page. In this way, the remote apparatus 106 presents the corresponding code segment by using the collaborative processing page in the collaborative processing window.

Figure 5:
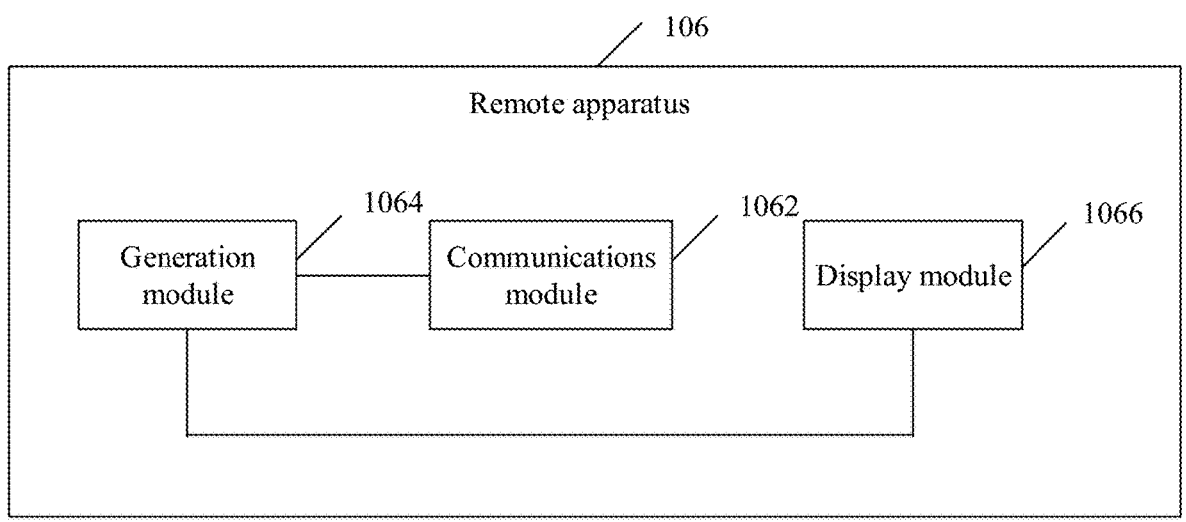
FIG. 5 is a schematic diagram of a structure of a remote apparatus according to an embodiment of this disclosure.

FIG. 5 is a schematic diagram of a structure of the remote apparatus 106. The remote apparatus 106 includes a communications module 1062 and a generation module 1064.

The communications module 1062 of the remote apparatus 106 may directly obtain a source file of a web page that is generated based on a conflict resolution result, for example, a source file of a collaborative processing page that is generated based on the conflict resolution result. The generation module 1064 may generate a collaborative processing window based on the source file of the collaborative processing page. The generation module 1064 creates a window, then parses the source file of the collaborative processing page, and renders the collaborative processing page in the window based on a parsing result, to generate the collaborative processing window. Correspondingly, the remote apparatus 106 further includes a display module 1066, and the display module 1066 may display the collaborative processing window, to support a remote user in confirming a resolution result of a local resolvable conflict block and resolving a local irresolvable conflict block by using the collaborative processing page in the collaborative processing window. The communications module 1062 may further receive a result of processing the conflict resolution result by the remote user based on the collaborative processing window. The processing result may be a result of confirming the resolution result of the local resolvable conflict block by the remote user and a result of resolving the local irresolvable conflict block by the remote user.

In another possible implementation, the remote apparatus 106 may obtain a conflict resolution result for a conflict field from the service apparatus 104, and generate a collaborative processing window based on the resolution result. The collaborative processing window includes a user interface of a collaborative processing tool. In this way, the remote apparatus 106 presents a corresponding code segment by using the user interface of the collaborative processing tool in the collaborative processing window.

Figure 6:
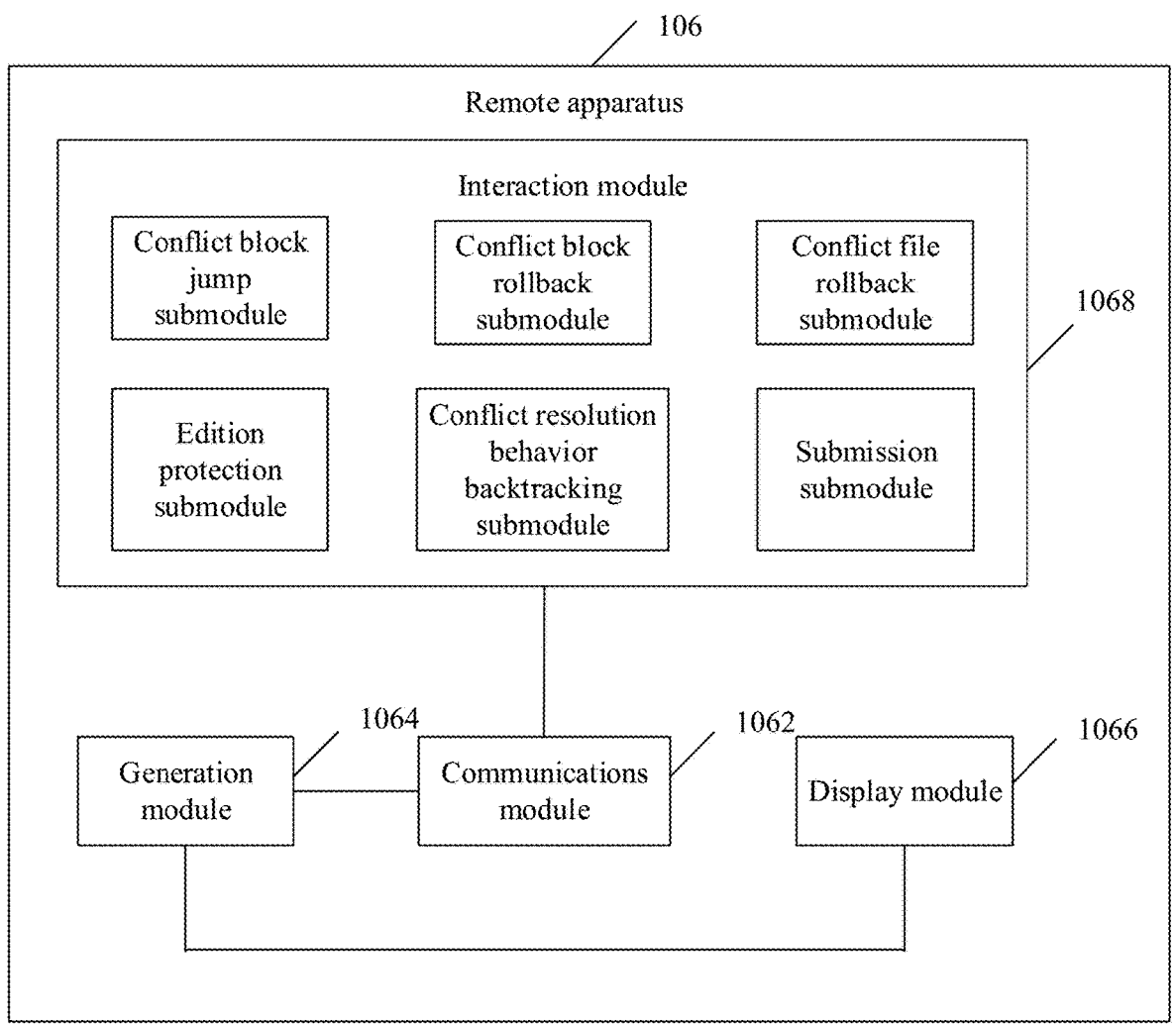
FIG. 6 is a schematic diagram of a structure of a remote apparatus according to an embodiment of this disclosure.

For details, refer to a schematic diagram of a structure of the remote apparatus 106 shown in FIG. 6. The remote apparatus 106 includes a communications module 1062, a generation module 1064, a display module 1066, and an interaction module 1068. The communications module 1062 is configured to obtain a conflict resolution result. The interaction module 1068 is configured to generate a user interface of a collaborative processing tool. The generation module 1064 is configured to generate a collaborative processing window based on the conflict resolution result. The collaborative processing window includes the user interface of the collaborative processing tool. The display module 1066 is configured to: display the collaborative processing window, and present, by using the user interface in the collaborative processing window, a code segment that is of a local resolvable conflict block before resolution and that is obtained based on the conflict resolution result, a code segment that is of the local resolvable conflict block after resolution and that is obtained based on the conflict resolution result, and a code segment that is of a local irresolvable conflict block and that is obtained based on the conflict resolution result, to support a remote user in collaboratively confirming a resolution result of the local resolvable conflict block and collaboratively resolving the local irresolvable conflict block. The communications module 1062 is further configured to receive a result of processing the conflict resolution result by the remote user based on the collaborative processing window.

In the embodiment shown in FIG. 5 or FIG. 6, the collaborative processing window may be further divided into a confirmation window and a resolution window. The acknowledgment window may present the code of the local resolvable conflict block before resolution and the code segment of the local resolvable conflict block after resolution by using the collaborative processing page or the user interface of the collaborative processing tool, to support the remote user in confirming the resolution result of the local resolvable conflict block. The resolution window may present the code of the local irresolvable conflict block by using the collaborative processing page or the user interface of the collaborative processing tool, to support the remote user in resolving the local irresolvable conflict block.

For the remote apparatus 106 shown in FIG. 5, the communications module 1062 is further configured to receive a collaborative resolution message. The collaborative resolution message may include a URL corresponding to the collaborative processing page. When the remote user triggers an operation of accessing the page corresponding to the URL, the communications module 1062 obtains the source file of the collaborative processing page corresponding to the URL. The generation module 1064 generates one or more of the collaborative processing window, the confirmation window, or the resolution window based on the source file. The display module 1066 displays the one or more of the collaborative processing windows, the confirmation window, or the resolution window, to support the remote user in collaboratively confirming the resolution result of the local irresolvable conflict block by using the collaborative processing window or the confirmation window, and support the remote user in collaboratively resolving the local irresolvable conflict block by using the collaborative processing window or the resolution window.

For the remote apparatus 106 shown in FIG. 6, the communications module 1062 is further configured to receive a collaborative resolution message. The collaborative resolution message is used to indicate a recommended user to confirm the resolution result of the local resolvable conflict block or resolve the local irresolvable conflict block by using the collaborative processing window. In implementation, the collaborative resolution message may include a conflict resolution result for a conflict field. The interaction module 1068 is configured to generate the user interface of the collaborative processing tool. The generation module 1064 is configured to generate one or more of the collaborative processing window, a confirmation window, or a resolution window based on the conflict resolution result for the conflict field. The collaborative processing window, the confirmation window, or the resolution window includes the foregoing user interface. The display module 1066 may display the one or more of the collaborative processing window, the confirmation window, or the resolution window, to support the remote user in collaboratively confirming the resolution result of the local irresolvable conflict block by using the user interface in the collaborative processing window or the confirmation window, and support the remote user in collaboratively resolving the local irresolvable conflict block by using the user interface in the collaborative processing window or the resolution window.

The interaction module 1068 may include one or more of a conflict block jump submodule, a conflict block rollback submodule, a conflict file rollback submodule, an edition protection submodule, a conflict resolution behavior backtracking submodule, and a submission submodule. For implementation of each submodule, refer to related content description in the embodiment shown in FIG. 4. Details are not described herein again.

In some possible implementations, when the remote user confirms the resolution result of the local resolvable conflict block based on the confirmation window or the collaborative processing window, the communications module 1062 of the remote apparatus 106 may further send, to the service apparatus 104, the result of confirming the resolution result of the local resolvable conflict block by the remote user, so that the service apparatus 104 updates, based on the confirmation result, a confidence of a resolution rule used to resolve the local resolvable conflict block.

When the remote user resolves the local irresolvable conflict block based on the resolution window or the collaborative processing window, the communications module of the remote apparatus 106 may further send, to the service apparatus 104, the result of resolving the local irresolvable conflict block by the remote user, so that the service apparatus 104 updates a resolution rule based on the result of resolving the local irresolvable conflict block by the remote user.

For ease of understanding, the following provides an example of a process of processing a conflict block in a collaborative processing window from a perspective of the remote apparatus 106.

As shown in FIG. 7, a remote user may access a collaborative processing page by using the remote apparatus 106, and display the collaborative processing page in a collaborative processing window. A conflict file directory tree is displayed on the left of the collaborative processing page, and a code segment of a conflict block is displayed on the right of the collaborative processing page, including a current code segment, a basic code segment, and a to-be-merged code segment. In addition, a processing control and a conflict block navigation control that correspond to the conflict block are further displayed on the right. As shown in FIG. 7, when the conflict block is a local resolvable conflict block, the processing control displayed on the right includes a confirmation control. After reading the code segment, the remote user may trigger, by using the confirmation control, an operation of confirming a resolution result of the local resolvable conflict block, and then save the operation.

Then, the remote user may switch a conflict block by using the conflict block navigation control, to process the switched conflict block. In an example, the remote user may switch to a next conflict block by using the conflict block navigation control. As shown in FIG. 8, when the conflict block is a local irresolvable conflict block, the processing control displayed on the right includes a resolution control, and the resolution control may include a plurality of shortcut keys including "Ours", "Base", "Theirs", "Ours and Base", and "Theirs and Ours", which respectively indicate that a current code segment is reserved, a basic segment is reserved, a to-be-merged segment is reserved, a to-be-merged segment is added to a current segment (the current segment is before the to-be-merged segment), and a current segment is added to a to-be-merged segment (the to-be-merged segment is before the current segment). The remote user may manually trigger one of the shortcut keys, to resolve the local irresolvable conflict block.

Figure 9:
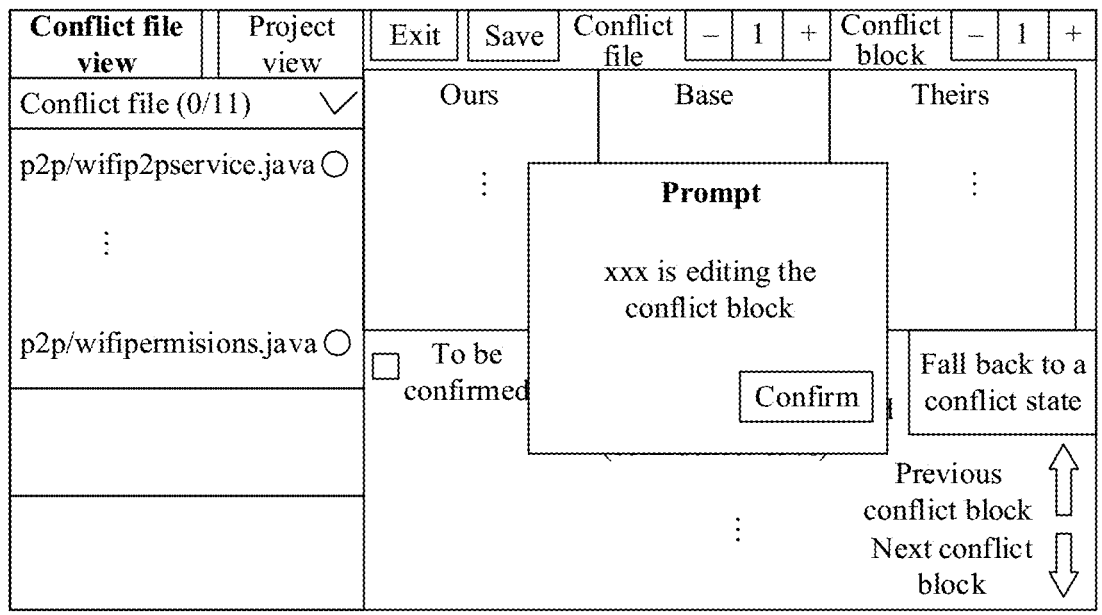
FIG. 9 is a schematic diagram of performing edition protection on a conflict block according to an embodiment of this disclosure.

It may be understood that, in a process in which a remote user performs collaborative processing on a conflict block, when a plurality of users processes a same conflict block, an edition protection mechanism may be triggered, and the remote apparatus 106 corresponding to the remote user performing postprocessing may display prompt information in a collaborative processing window. As shown in FIG. 9, the remote apparatus 106 may display the prompt information in a pop-up window in the collaborative processing window, to prompt the remote user performing postprocessing that the conflict block is being edited. In this way, the remote user performing postprocessing may first process another conflict block, to improve conflict resolution efficiency.

Figure 10:
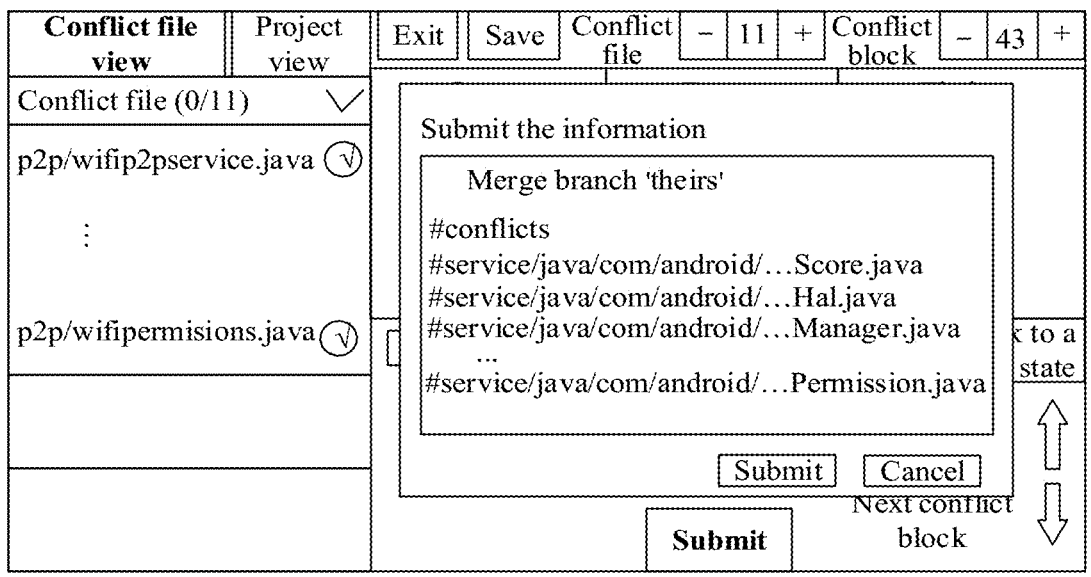
FIG. 10 is a schematic diagram of submitting a code file obtained after resolution is completed according to an embodiment of this disclosure.

When conflict resolution on all conflict files corresponding to a conflict field is completed, a submission control may be further displayed in the collaborative processing window. As shown in FIG. 10, a user with submission permission (referred to as a committer in this disclosure) may trigger a submission operation by using the submission control, to submit a processed code file. Considering a possibility of a user misoperation, after the committer triggers the submission operation, the display module 1066 of the remote apparatus 106 may further display submission information, so that the user determines, based on the submission information, whether to perform submission.

It can be learned that a remote user at a remote end is introduced to perform collaborative confirmation on a resolution result of a conflict block that is automatically resolved by the local apparatus 102, so that conflict resolution quality is ensured, and collaborative resolution is performed on a conflict block that is not resolved by the local apparatus 102, thereby improving resolution efficiency.

It should be noted that the embodiments shown in FIG. 2 to FIG. 6 are merely example division manners of the local apparatus 102, the service apparatus 104, and the remote apparatus 106. In other possible implementations of the embodiments of this disclosure, the local apparatus 102, the service apparatus 104, and the remote apparatus 106 may also be divided into different functional modules. For example, some functional modules may be split or combined based on the embodiments shown in FIG. 2 to FIG. 6.

An embodiment of this disclosure further provides the implemented code conflict resolution method described above. The following describes the code conflict resolution method from a perspective of interaction between the apparatuses.

Figure 11A:
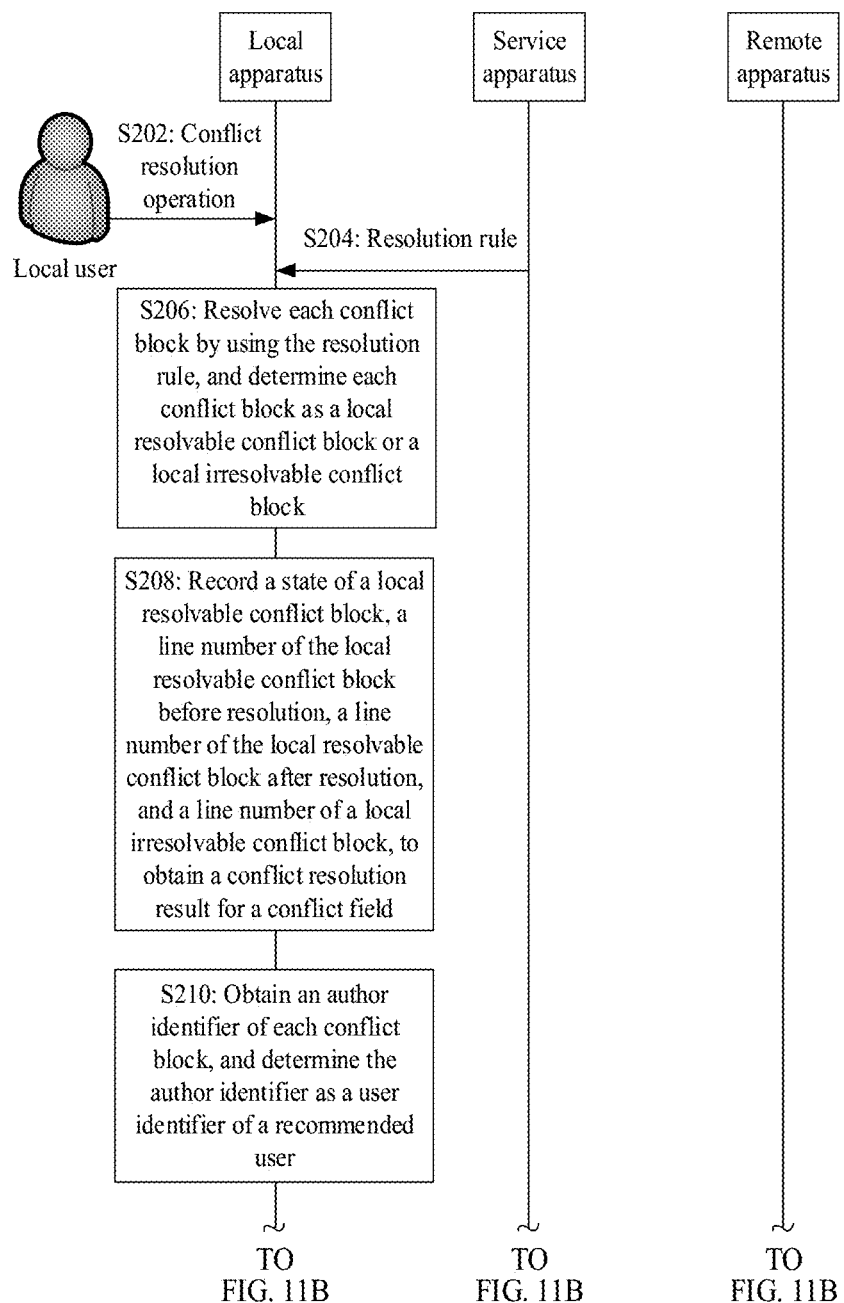
FIG. 11A and FIG. 11B are a flowchart of a code conflict resolution method according to an embodiment of this disclosure.
Figure 11B:
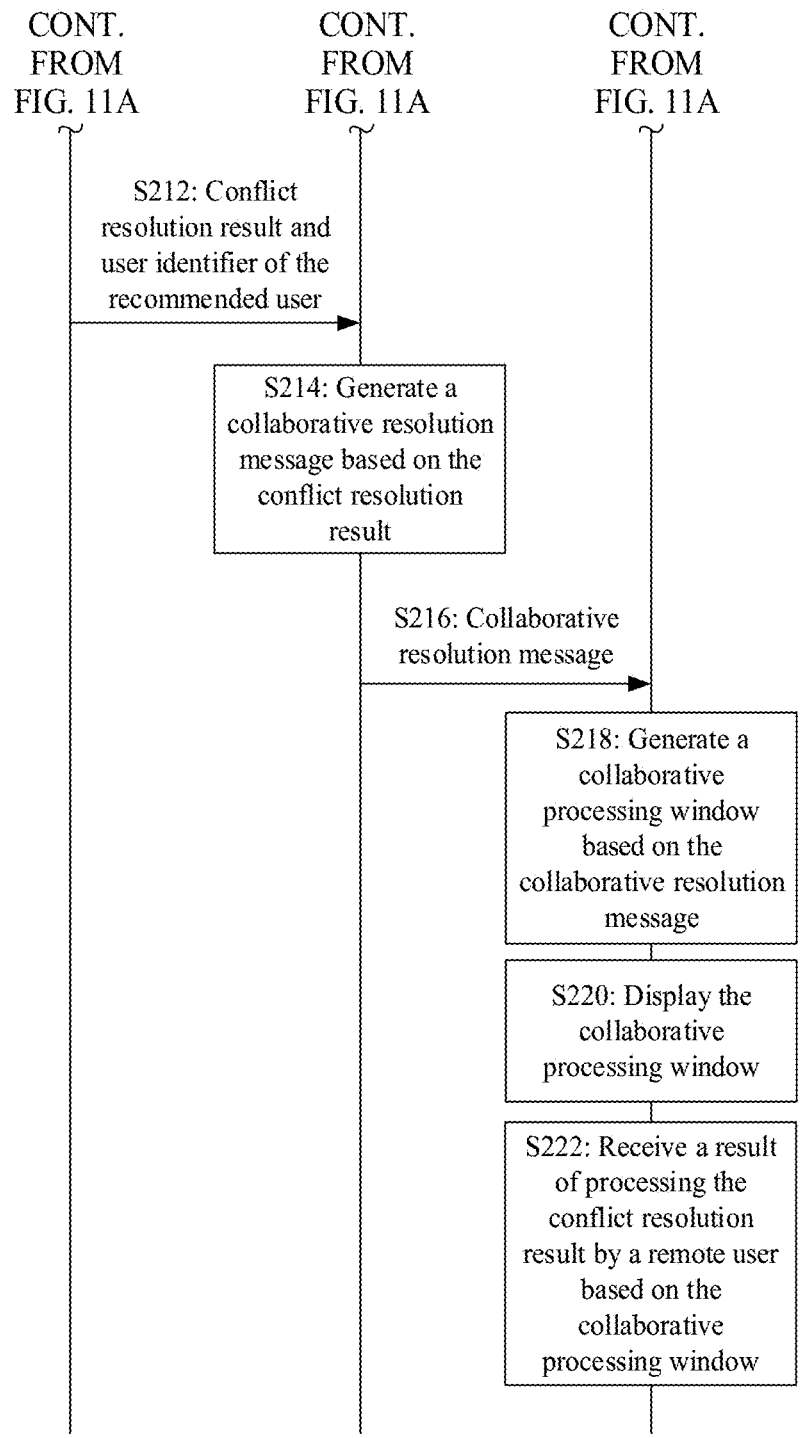

FIG. 11A and FIG. 11B are a flowchart of a code conflict resolution method. The method is applied to a conflict resolution system, and the conflict resolution system includes a local apparatus 102, a service apparatus 104, and a remote apparatus 106. The method includes the following steps.

S202: A local user triggers a conflict resolution operation for a conflict field generated by merging code files of a plurality of versions.

In implementation, the local user may trigger the conflict resolution operation for the conflict field based on a resolution control provided by a GUI of the local apparatus, or may trigger the conflict resolution operation for the conflict field based on a resolution command provided by a CLI of the local apparatus.

In some cases, the local user may alternatively automatically trigger, when triggering a merge operation for the code files of the plurality of versions, the conflict resolution operation for the conflict field generated by merging the code files of the plurality of versions.

S204: The local apparatus 102 invokes, in response to the conflict resolution operation triggered by the local user, a conflict resolution tool to obtain a resolution rule from the service apparatus 104.

The service apparatus 104 stores at least one resolution rule, which is used to perform conflict resolution on at least one code conflict resolution type. The local apparatus 102 may obtain the resolution rule from the service apparatus by using the built-in conflict resolution tool, to perform resolution on the conflict field. In some cases, the local apparatus 102 may also prestore a resolution rule. In this way, S204 is an optional step. When the local user triggers the conflict resolution operation, the local apparatus 102 may also obtain the prestored resolution rule to perform resolution on the conflict field.

In some possible implementations, the service apparatus 104 may further store a confidence of each resolution rule, the service apparatus 104 may update the confidence of each resolution rule in real time or periodically, and the service apparatus 104 may manage the resolution rule based on the confidence of each resolution rule. For example, the service apparatus 104 may perform offline processing on a resolution rule whose confidence is less than a preset confidence threshold. In this way, when obtaining the resolution rule from the service apparatus 104 to perform conflict resolution, the local apparatus 102 can ensure that each obtained resolution rule is a resolution rule with a relatively high confidence, thereby improving accuracy of automatic resolution by the local apparatus 102.

S206: The local apparatus 102 resolves each conflict block in the conflict field by using the resolution rule, and determines each conflict block as a local resolvable conflict block or a local irresolvable conflict block.

In implementation, the local apparatus 102 may perform one of the following operations on each conflict block according to the resolution rule: reserving only a current code segment, including only a basic code segment, reserving only a to-be-merged code segment, adding a to-be-merged code segment to a current code segment, adding a current code segment to a to-be-merged code segment, or skipping processing, to resolve each conflict block.

A conflict block on which an operation of reserving a current code segment, including only a basic code segment, reserving only a to-be-merged code segment, adding a to-be-merged code segment to a current code segment, or adding a current code segment to a to-be-merged code segment is performed is a local resolvable conflict block, and a conflict block on which an operation of skipping processing is performed is a local irresolvable conflict block.

S208: The local apparatus 102 records a state of a local resolvable conflict block, a line number of the local resolvable conflict block before resolution, a line number of the local resolvable conflict block after resolution, and a line number of a local irresolvable conflict block, to obtain a conflict resolution result for the conflict field.

The conflict block in the conflict field is included in a conflict file. Therefore, the local apparatus 102 may identify the conflict block by using a line number of the conflict block in the conflict file. Considering that the line number of the local resolvable conflict block before resolution and the line number of the local resolvable conflict block after resolution may change, the local apparatus may record a line number of the local resolvable conflict block before resolution in the conflict file and a line number of the local resolvable conflict block after resolution in the conflict file, to identify the local resolvable conflict block.

The line number of the conflict block in the conflict file is only an example implementation of identifying the conflict block. In actual application, the local apparatus 102 may also identify the conflict block in another manner, so that another apparatus, such as the remote apparatus 106, obtains, based on an identifier of the conflict block, a basic code segment, a current code segment, and a to-be-merged code segment that correspond to the conflict block.

S210: The local apparatus 102 obtains an author identifier of each conflict block, and determines the author identifier as a user identifier of a recommended user.

The local apparatus 102 analyzes a basic code segment, a current code segment, and a to-be-merged code segment that correspond to each conflict block, obtains an author identifier corresponding to an author of each line of code in the code segment, such as a user name, an account, or an email, as the author identifier of each conflict block, and determines the author identifier as the user identifier of the recommended user.

It should be noted that the local apparatus 102 may further obtain other author information other than the author identifier of each conflict block, for example, an author edition time. In this way, the local apparatus 102 may further perform screening based on the author edition time, to determine the recommended user. For example, when a specific conflict block has a plurality of authors, the local apparatus 102 may select an author whose author edition time falls within a preset time range as the recommended user, and determine the author identifier whose author edition time falls within the preset time range as the user identifier of the recommended user.

In some cases, the local apparatus 102 may directly determine any one or more of a preset default user, a friend user of the local user, or a user that belongs to a same group as the local user as the recommended user, and determine a user identifier of the user as the user identifier of the recommended user.

S212: The local apparatus 102 sends the conflict resolution result and the user identifier of the recommended user to the service apparatus 104.

The conflict resolution result includes an identifier of the local resolvable conflict block, an identifier of the local irresolvable conflict block, and a resolution state of each conflict block. When sending the conflict resolution result and the user identifier of the recommended user, the local apparatus 102 may further first determine a conflict block corresponding to each recommended user, and send a user identifier of each recommended user and a corresponding conflict block identifier to the service apparatus 104. In this way, in a subsequent collaborative resolution process, each recommended user may collaboratively confirm a resolution result of a local resolvable conflict block corresponding to each recommended user, and collaboratively resolve a local irresolvable conflict block corresponding to each recommended user.

S214: The service apparatus 104 generates a collaborative resolution message based on the conflict resolution result.

In some possible implementations, the service apparatus 104 may develop a collaborative processing page by using a dynamic web page development tool and technology. The service apparatus 104 may generate a source file of a collaborative processing page by using any one or more of HTML, ASP, JSP, PHP, or the like based on the conflict resolution result. The source file may be a file in a jsp format, a php format, or an asp format. Then, the service apparatus 104 may generate the collaborative resolution message. The collaborative resolution message includes a URL of the collaborative processing page. Further, the collaborative resolution message may indicate the recommended user to access the collaborative processing page to confirm the resolution result of the local resolvable conflict block or resolve the local irresolvable conflict block.

In another possible implementation, the service apparatus 104 may alternatively directly generate a collaborative resolution message. The collaborative resolution message includes the conflict resolution result. In this way, the remote apparatus 106 may generate a collaborative processing window based on the conflict resolution result in the collaborative resolution message.

S216: The service apparatus 104 sends the collaborative resolution message to the remote apparatus 106 based on the user identifier of the recommended user.

The service apparatus 104 stores a correspondence between the user identifier of the recommended user and the remote apparatus 106. The service apparatus 104 may determine, based on the correspondence, the remote apparatus 106 corresponding to the recommended user, and send the collaborative resolution message to the remote apparatus 106.

S218: The remote apparatus 106 generates the collaborative processing window based on the collaborative resolution message.

When the collaborative resolution message includes a URL of the collaborative processing page, the recommended user may trigger an operation of accessing the URL, and the remote apparatus 106 may obtain the source file of the collaborative processing page from the service apparatus 104 in response to the operation. It should be noted that, when the collaborative processing page is a dynamic page, the source file of the collaborative processing page includes code executed by the service apparatus 104, which is code written based on a dynamic program language. The service apparatus 104 first executes the code to obtain a source file in a static format, such as a source file in a format such as HTML or HTM. The remote apparatus 106 obtains the source file in the foregoing static format from the service apparatus 104. The remote apparatus 106 may create a window, parse the source file of the collaborative processing page, and draw the collaborative processing page in the window based on a parsing result, to obtain the collaborative processing window.

When the collaborative resolution message includes the conflict resolution result, the remote apparatus 106 generates the collaborative processing window based on the conflict resolution result. The collaborative processing window includes a user interface of the collaborative processing tool, and the user interface displays a code segment that is of the local resolvable conflict block before resolution and that is obtained from the local apparatus 102, a code segment that is of the local resolvable conflict block after resolution and that is obtained from the local apparatus 102, and a code segment that is of the local irresolvable conflict block and that is obtained from the local apparatus 102.

S220: The remote apparatus 106 displays the collaborative processing window.

The collaborative processing window includes the collaborative processing page or the user interface of the collaborative processing tool. The collaborative processing page or the user interface of the collaborative processing tool displays the code segment that is of the local resolvable conflict block before resolution and that is obtained from the local apparatus 102, the code segment that is of the local resolvable conflict block after resolution and that is obtained from the local apparatus 102, and the code segment that is of the local irresolvable conflict block and that is obtained from the local apparatus 102. The recommended user may be used as a remote user, to collaboratively confirm the resolution result of the local resolvable conflict block and collaboratively resolve the local irresolvable conflict block by using the collaborative processing page or the code segment displayed on the user interface of the collaborative processing tool.

S222: The remote apparatus 106 receives a result of processing the conflict resolution result by the remote user based on the collaborative processing window.

The remote user may process the conflict resolution result based on the code segment of the conflict block that is displayed on the collaborative processing window, for example, confirm the resolution result of the local resolvable conflict block, and resolve the local irresolvable conflict block, to obtain the processing result. The remote apparatus 106 receives the processing result, and saves the processing result.

It should be noted that the remote apparatus 106 may further send, to the service apparatus 104, a result of confirming the resolution result of the local resolvable conflict block by the remote user, so that the service apparatus 104 updates, based on the confirmation result, a confidence of a resolution rule used to resolve the local resolvable conflict block. The remote apparatus 106 may further send, to the service apparatus 104, a result of resolving the local irresolvable conflict block by the remote user, so that the service apparatus 104 updates a resolution rule based on the result of resolving the local irresolvable conflict block.

The local apparatus 102, the service apparatus 104, and the remote apparatus 106 in the embodiments of this disclosure may correspondingly perform the method described in the embodiments of this disclosure, and the foregoing operations and/or functions and other operations and/or functions of the modules in the local apparatus 102, the service apparatus 104, and the remote apparatus 106 are separately used to implement corresponding procedures of the method in FIG. 11A and FIG. 11B. For brevity, details are not described herein again.

Figure 12:
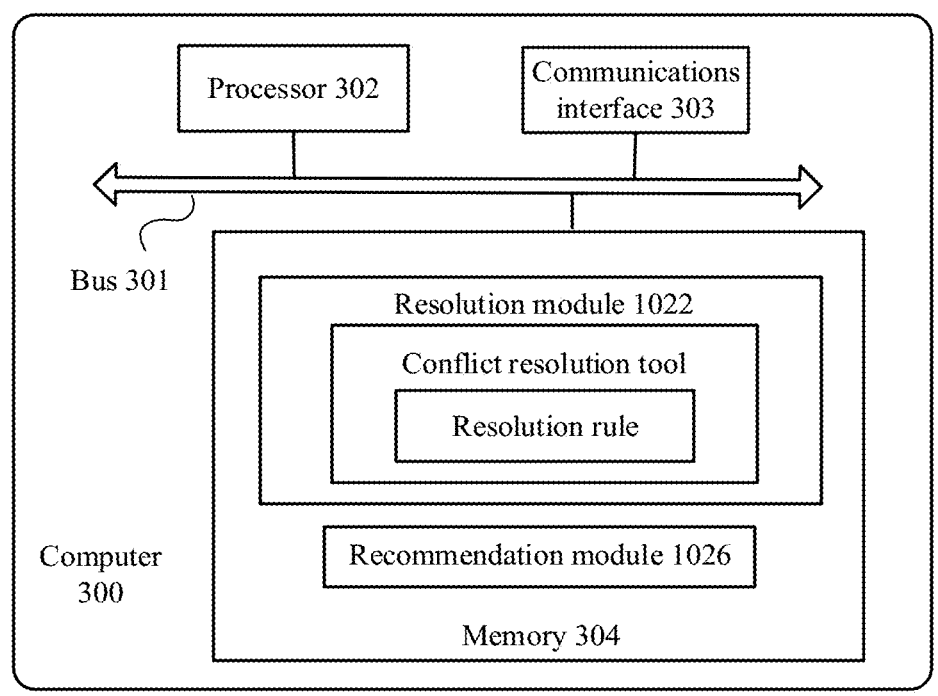
FIG. 12 is a schematic diagram of a structure of a computer according to an embodiment of this disclosure.
Figure 13:
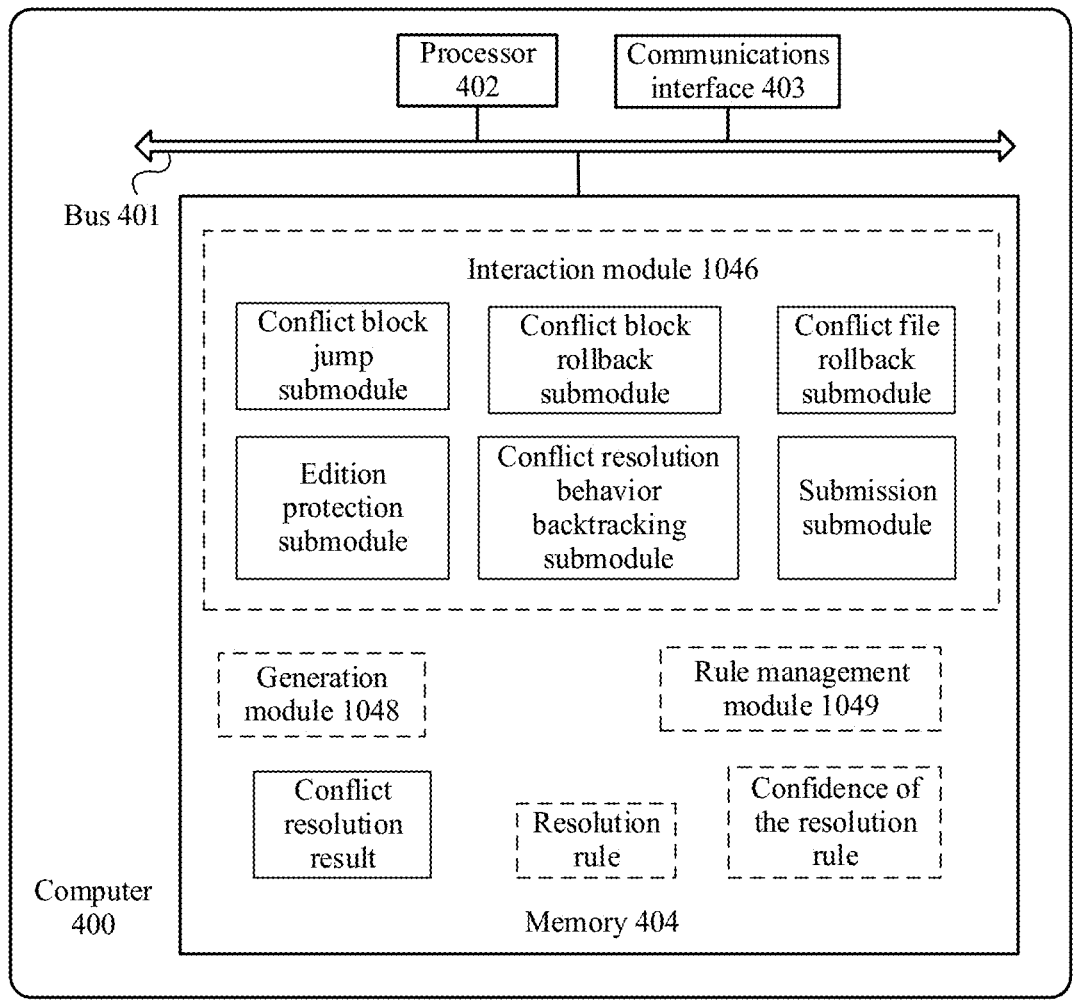
FIG. 13 is a schematic diagram of a structure of a computer according to an embodiment of this disclosure.
Figure 14:
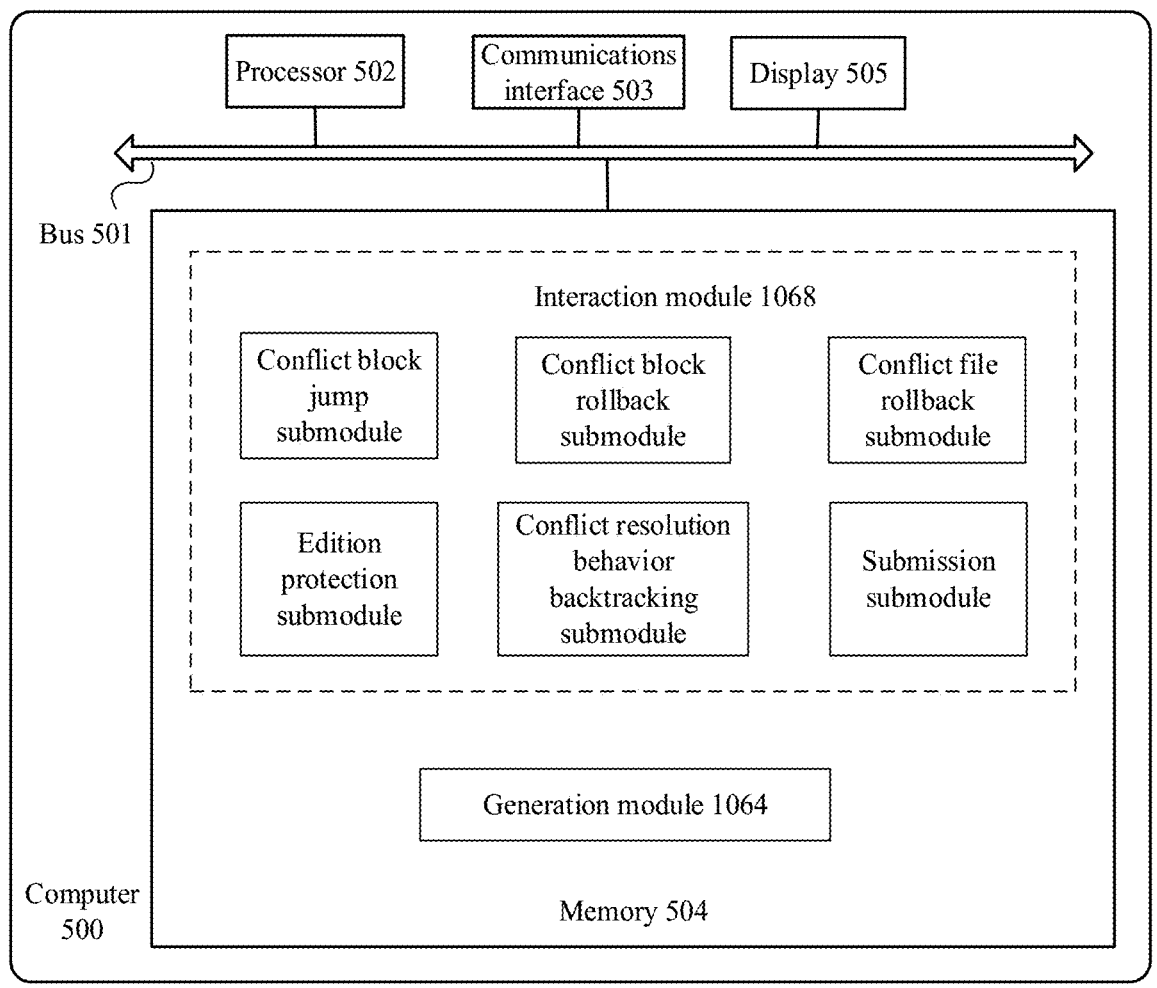
FIG. 14 is a schematic diagram of a structure of a computer according to an embodiment of this disclosure.

FIG. 12 to FIG. 14 provide a computer. A computer 300 shown in FIG. 12 may be configured to implement a function of the local apparatus 102 in the embodiment shown in FIG. 2. A computer 400 shown in FIG. 13 may be configured to implement a function of the service apparatus 104 in the embodiments shown in FIG. 3 and FIG. 4. A computer 500 shown in FIG. 14 may be configured to implement a function of the remote apparatus 106 in the embodiments shown in FIG. 5 and FIG. 6.

The computer 300 includes a bus 301, a processor 302, a communications interface 303, and a memory 304. The processor 302, the memory 304, and the communications interface 303 communicate with each other by using the bus 301. The bus 301 may be a Peripheral Component Interconnect (PCI) bus, an Extended Industry Standard Architecture (EISA) bus, or the like. Buses may be classified into an address bus, a data bus, a control bus, and the like. For ease of indication, only one thick line is used to represent in FIG. 12, but it does not mean that there is only one bus or only one type of bus. The communications interface 303 is configured to perform external communication, for example, receive a conflict resolution result or receive a source file of a collaborative processing page generated based on the conflict resolution result.

The processor 302 may be a central processing unit (CPU). The memory 304 may include a volatile memory, for example, a random-access memory (RAM). Alternatively, the memory 304 may include a non-volatile memory, for example, a read-only memory (ROM), a flash memory, a hard disk drive (HDD), or a solid-state drive (SSD).

The memory 304 stores executable code, and the processor 302 executes the executable code to perform the foregoing code conflict resolution method.

When the embodiment shown in FIG. 2 is implemented, and each module described in the embodiment in FIG. 2 is implemented by using software, software or program code required for implementing functions of the resolution module 1022 and the recommendation module 1026 in FIG. 2 is stored in the memory 304. A function of the communications module 1024 is implemented through the communications interface 303. The processor is configured to execute instructions in the memory 304, to perform the code conflict resolution method applied to the local apparatus 102.

The computer 400 includes a bus 401, a processor 402, a communications interface 403, and a memory 404. The processor 402, the memory 404, and the communications interface 403 communicate with each other through the bus 401. When the computer 400 implements the embodiment in FIG. 3 or FIG. 4, and each module described in the embodiment in FIG. 3 or FIG. 4 is implemented by using software, software or program code required for implementing a function of the interaction module 1046, the generation module 1048, or the rule management module 1049 in FIG. 3 or FIG. 4 is stored in the memory 404. A conflict resolution result is stored in the memory 404, and the memory 404 may further store a resolution rule and a confidence of the resolution rule. A function of the communications module 1042 is implemented through the communications interface 403. A function of the storage module 1044 function is implemented through the memory 404. The processor 402 is configured to execute instructions in the memory 404, to perform the code conflict resolution method applied to the service apparatus 104.

The computer 500 includes a bus 501, a processor 502, a communications interface 503, a memory 504, and a display 505. The display 505 may be a liquid-crystal display (LCD), an organic light-emitting diode (OLED), or the like. The processor 502, the memory 504, the display 505, and the communications interface 503 communicate with each other through the bus 501. When the computer 500 implements the embodiment in FIG. 5 or FIG. 6, and each module described in the embodiment in FIG. 5 or FIG. 6 is implemented by using software, software or program code required for implementing functions of the generation module 1064 and the interaction module 1068 in FIG. 5 or FIG. 6 is stored in the memory 504. A function of the communications module 1062 is implemented through the communications interface 503. A function of the display module 1066 is implemented through the display 505. The processor is configured to execute instructions in the memory 504, to perform the code conflict resolution method applied to the remote apparatus 106.

An embodiment of this disclosure further provides a computer-readable storage medium, including instructions. When the instructions are run on a computer, the computer is enabled to perform the foregoing code conflict resolution method applied to the local apparatus 102.

An embodiment of this disclosure further provides a computer-readable storage medium, including instructions. When the instructions are run on a computer, the computer is enabled to perform the foregoing code conflict resolution method applied to the service apparatus 104.

An embodiment of this disclosure further provides a computer-readable storage medium, including instructions. When the instructions are run on a computer, the computer is enabled to perform the foregoing code conflict resolution method applied to the remote apparatus 106.

An embodiment of this disclosure further provides a computer program product. When the computer program product is executed by a computer, the computer is enabled to perform any method provided in the foregoing code conflict resolution method. The computer program product may be a software installation package. If any method provided in the foregoing code conflict resolution method needs to be used, the computer program product may be downloaded, and the computer program product may be executed on the computer.

In addition, it should be noted that the described apparatus embodiment is merely an example. The units described as separate parts may or may not be physically separate, and parts displayed as units may or may not be physical units, that is, may be located in one place, or may be distributed on a plurality of network units. Some or all the modules may be selected according to an actual need to achieve the objectives of the solutions of the embodiments. In addition, in the accompanying drawings of the apparatus embodiments provided by this disclosure, connection relationships between modules indicate that the modules have communication connections with each other, which may be implemented as one or more communications buses or signal cables.

Based on the description of the foregoing implementations, a person skilled in the art may clearly understand that this disclosure may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a hardware structure used to implement a same function may be in various forms, for example, in a form of an analog circuit, a digital circuit, a dedicated circuit, or the like. However, as for this disclosure, software program implementation is a better implementation in most cases. Based on such an understanding, the technical solutions of this disclosure essentially or the part contributing to a conventional technology may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a training device, or a network device) to perform the methods described in the embodiments of this disclosure.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this disclosure are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, an SSD, or the like.

What is claimed is:

1. A method, comprising:
   receiving, from a local apparatus, a conflict resolution result for a conflict field, wherein the conflict field is based on code files of a plurality of versions, wherein the conflict field comprises a conflict block, and wherein the conflict resolution result comprises an identifier of a local irresolvable conflict block;
   storing the conflict resolution result to provide the conflict resolution result to a remote apparatus;
   receiving, from the remote apparatus, a first result of resolving the local irresolvable conflict block by a remote user;
   updating, based on the first result, a resolution rule, wherein the resolution rule is configured to be used by the local apparatus to resolve the conflict block; and
   updating, based on a second result of confirming a resolution result of a local resolvable conflict block by the remote user, a confidence of the resolution rule.

2. The method of claim 1, further comprising:
   receiving, from the local apparatus, a user identifier of a recommended user; and
   sending, to the remote apparatus based on the user identifier, a collaborative resolution message,
   wherein the collaborative resolution message instructs the recommended user to process, based on a collaborative processing window, the conflict resolution result.

3. The method of claim 1, wherein the conflict resolution result comprises the resolution result, and wherein the method further comprises receiving, from the remote apparatus, the second result.

4. An apparatus, comprising:
   a memory configured to store instructions; and
   a processor coupled to the memory and configured to execute the instructions to cause the apparatus to:
     receive a conflict resolution result for a conflict field that is from a local apparatus, wherein the conflict field is from combining code files of a plurality of versions, wherein the conflict field comprises a conflict block, and wherein the conflict resolution result comprises an identifier of a local irresolvable conflict block;
     store the conflict resolution result to provide the conflict resolution result to a remote apparatus;
     receive, from the remote apparatus, a first result of resolving the local irresolvable conflict block by a remote user;
     update, based on the first result, a resolution rule, wherein the resolution rule is configured to be used by the local apparatus to resolve the conflict block; and
     update, based on a second result of confirming a resolution result of a local resolvable conflict block by the remote user, a confidence of the resolution rule.

5. The apparatus of claim 4, wherein the processor is further configured to execute the instructions to cause the apparatus to:

receive, from the local apparatus, a user identifier of a recommended user; and send, based on the user identifier and to the remote apparatus, a collaborative resolution message, wherein the collaborative resolution message indicates the recommended user to process, based on a collaborative processing window, the conflict resolution result.

6. The apparatus of claim 4, wherein the conflict resolution result comprises the resolution result, and wherein the processor is further configured to execute the instructions to cause the apparatus to receive, from the remote apparatus, the second result.

7. The apparatus of claim 4, wherein the code files comprise a basic code segment, a current code segment, and a to-be-merged code segment.

8. The apparatus of claim 7, wherein the conflict block comprises differences between the basic code segment, the current code segment, and the to-be-merged code segment.

9. A computer program product comprising instructions stored on a non-transitory computer-readable medium that, when executed by a processor, cause an apparatus to:

receive a conflict resolution result for a conflict field that is from a local apparatus, wherein the conflict field is from combining code files of a plurality of versions, wherein the conflict field comprises a conflict block, and wherein the conflict resolution result comprises an identifier of a local irresolvable conflict block;

store the conflict resolution result to provide the conflict resolution result to a remote apparatus;

receive, from the remote apparatus, a first result of resolving the local irresolvable conflict block by a remote user;

update, based on the first result, a resolution rule, wherein the resolution rule is configured to be used by the local apparatus to resolve the conflict block; and update, based on a second result of confirming a resolution result of a local resolvable conflict block by the remote user, a confidence of the resolution rule.

10. The computer program product of claim 9, wherein the conflict resolution result comprises the resolution result, and wherein the processor is further configured to execute the instructions to cause the apparatus to receive, from the remote apparatus, the second result.

11. The computer program product of claim 9, wherein the code files comprise a basic code segment, a current code segment, and a to-be-merged code segment.

12. The computer program product of claim 11, wherein the conflict block comprises differences between the basic code segment, the current code segment, and the to-be-merged code segment.

13. The computer program product of claim 9, wherein the processor is further configured to execute the instructions to cause the apparatus to:

receive, from the local apparatus, a user identifier of a recommended user; and send, based on the user identifier and to the remote apparatus, a collaborative resolution message, wherein the collaborative resolution message indicates the recommended user to process, based on a collaborative processing window, the conflict resolution result.

14. The computer program product of claim 13, wherein the processor is further configured to execute the instructions to cause the apparatus to analyze a basic code segment, a current code segment, and a to-be-merged code segment to identify the recommended user.

15. The computer program product of claim 14, wherein the recommended user corresponds to an author of the basic code segment, the current code segment, or the to-be-merged code segment.

16. The computer program product of claim 14, wherein the recommended user corresponds to a user name associated with the basic code segment, the current code segment, or the to-be-merged code segment.

17. The computer program product of claim 14, wherein the recommended user corresponds to an email address associated with the basic code segment, the current code segment, or the to-be-merged code segment.

18. The computer program product of claim 13, wherein the recommended user corresponds to a default user.

19. The computer program product of claim 13, wherein the recommended user corresponds to an author having an author edition time within a preset time range.

20. The computer program product of claim 13, wherein the recommended user is from a user group.

* * * * *